United States Patent [19]
Franz et al.

[11] Patent Number: 6,040,821
[45] Date of Patent: Mar. 21, 2000

[54] CURSOR TRACKING

[75] Inventors: Patrick J. Franz, Portland; Philip D. Biehl, Tigard; David H. Straayer, Colton; Robert H. Dodier, Portland, all of Oreg.

[73] Assignee: InControl Solutions, Inc., Beaverton, Oreg.

[21] Appl. No.: 08/006,139

[22] Filed: Jan. 19, 1993

Related U.S. Application Data

[63] Continuation of application No. 07/688,921, Apr. 19, 1991, abandoned, which is a continuation-in-part of application No. 07/649,711, Feb. 1, 1991, Pat. No. 5,189,403, which is a continuation-in-part of application No. 07/412,680, Sep. 26, 1989, Pat. No. 5,124,689, said application No. 07/688,921, is a continuation-in-part of application No. 07/557,546, Jul. 24, 1990, Pat. No. 5,231,386, said application No. 07/688,921, is a continuation-in-part of application No. 07/672,641, Mar. 18, 1991, Pat. No. 5,252,971.

[51] Int. Cl.$^7$ ..................................................... G09G 5/08
[52] U.S. Cl. ........................................... 345/159; 345/157
[58] Field of Search ................................... 340/706, 709, 340/710, 712; 341/22, 23; 345/156, 157, 159, 168, 172, 160, 145

[56] References Cited

U.S. PATENT DOCUMENTS

| 4,201,489 | 5/1980 | Zapp ....................................... 400/485 |
| 4,246,452 | 1/1981 | Chandler ................................. 200/5 A |
| 4,313,113 | 1/1982 | Thornburg .............................. 340/709 |

(List continued on next page.)

FOREIGN PATENT DOCUMENTS

| 78209030 | 9/1990 | China . |
| 0 365 305 | 10/1989 | European Pat. Off. . |
| 35 23 270 A1 | 1/1987 | Germany . |
| 39 13 648 C1 | 1/1990 | Germany . |
| 62-279419 | 5/1988 | Japan . |
| WO 81/02272 | 8/1981 | WIPO ................................ B41J 5/10 |
| 8906023 | 6/1989 | WIPO . |

OTHER PUBLICATIONS

Alistair D.N. Edwards "Modelling blind user's interactions with an auditory computer interface" 1989, pp. 575–589.
Lindahl, "A Digital Compensation Technique for Pressure Transducers", 1982, pp. 343–344.
J. D. Rutledge, T. Selker, Force–to–Motion Functions for Pointing, *Human–Computer Interaction—Interact '90*, pp. 701–706, IBM T.J. Watson Research Center, Yorktown, N.W., 1990.
Osiris Technologies, Inc., *OmniPoint™Embedded Cursor Control*, Nov. 1988.

(List continued on next page.)

*Primary Examiner*—Regina Liang
*Attorney, Agent, or Firm*—Marger Johnson & McCollom

[57] ABSTRACT

In a cursor tracking system (FIG. 11), a pointing device includes a plurality of force sensors (304), optionally integrated with a keyswitch on a computer keyboard. The force sensors detect lateral and vertical forces applied to the keycap (300) by a user (302) for cursor control. Raw force data is acquired by A/D apparatus (306) and transmitted (310,312) to a host processor. Driver level software in the host linearizes the raw force values (316, FIG. 12D) to compensate for anomolies and nonlinearities in the force sensors, keyboard mechanics, and A/D. The resulting linear force values are adjusted (320) to compensate for preloading bias forces (318) on the sensors. The unbiased, linear force values and sensor configuration (322) are used to determine a net XY vector (324, FIG. 16). A speed value is determined by a quadratic mapping of the XY vector magnitude (328), taking mouse button status into account. The speed value is scaled by a speed factor, clamped according to a speed limit value, and the result used to determine a total displacement value which, in turn, is used to scale the XY vectors to determine X and Y cursor displacement for repositioning the cursor. The quadratic mapping coefficients, as well as the speed factor and speed limit values, are user-alterable at run time, to allow customizing the response of the cursor tracking system. The result is a low-cost pointing system having excellent responsiveness for ergonomic efficiency. The system is useful in most computer systems, such as IBM AT-compatible systems, to allow pointing operations without use of a separate pointing device such as a mouse.

27 Claims, 12 Drawing Sheets

U.S. PATENT DOCUMENTS

| | | | |
|---|---|---|---|
| 4,314,227 | 2/1982 | Eventoff | 338/99 |
| 4,374,381 | 2/1983 | Ng et al. | 340/711 |
| 4,408,103 | 10/1983 | Smith, III | 200/6 A |
| 4,410,872 | 10/1983 | Stecher et al. | 338/114 |
| 4,439,648 | 3/1984 | Reiner et al. | 200/6 A |
| 4,649,784 | 3/1987 | Fulks et al. | 84/1.1 |
| 4,654,647 | 3/1987 | Wedam | 340/709 |
| 4,673,919 | 6/1987 | Kataoka | 340/709 |
| 4,680,577 | 7/1987 | Straayer | 345/172 |
| 4,712,101 | 12/1987 | Culver | 340/710 |
| 4,734,034 | 3/1988 | Maness et al. | 433/68 |
| 4,736,191 | 4/1988 | Matzke et al. | 340/709 |
| 4,745,301 | 5/1988 | Michalchik | 307/119 |
| 4,780,701 | 10/1988 | Eppinger | 338/474 |
| 4,786,895 | 11/1988 | Castaneda | 340/709 |
| 4,787,051 | 11/1988 | Olson | 360/710 |
| 4,794,366 | 12/1988 | Sakamoto | 338/114 |
| 4,816,200 | 3/1989 | Stecher et al. | 264/479 |
| 4,816,810 | 3/1989 | Moore | 340/706 |
| 4,856,993 | 8/1989 | Maness et al. | 433/68 |
| 4,874,549 | 10/1989 | Michalchik | 252/511 |
| 4,924,433 | 5/1990 | Hirata et al. | 340/709 |
| 4,931,781 | 6/1990 | Miyakawa | 340/709 |
| 4,933,660 | 6/1990 | Wynne, Jr. | 338/114 |
| 4,951,985 | 8/1990 | Pong et al. | 293/102 |
| 4,974,183 | 11/1990 | Miller | 364/709.12 |
| 4,983,786 | 1/1991 | Stevens et al. | 340/709 |
| 5,012,231 | 4/1991 | Felsenstein | |

OTHER PUBLICATIONS

IBM Technical Disclosure Bulletin "Compact Computer Keyboard", Mar. 1985. vol. 27 No. 10A pp. 5640–5642.

Borland International, Inc. *Turbo Pascal version 3.0 reference manual,* 1985, pp. 22–25.

IBM Corp., 700 *IBM Technical Disclosure Bulletin,* Oct. 31, 1988, vol. 31, No. 5, pp. 276–277. .

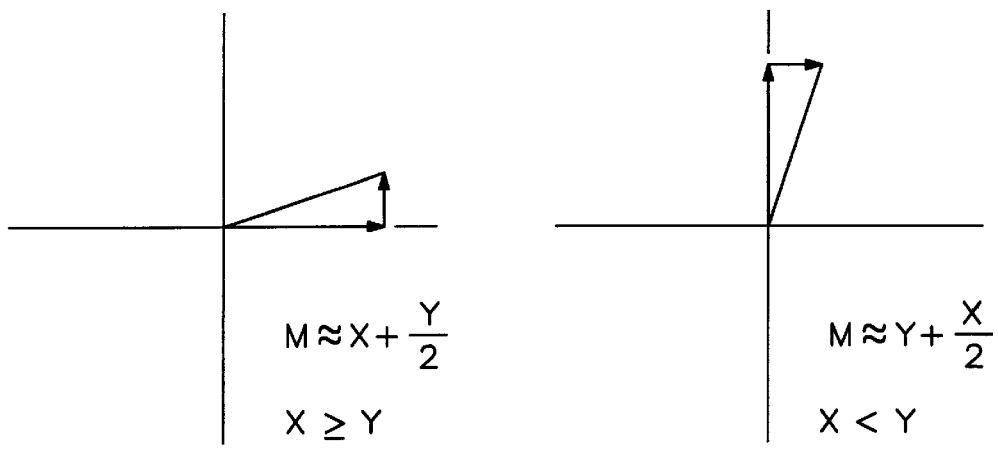
FIG.16A  FIG.16B
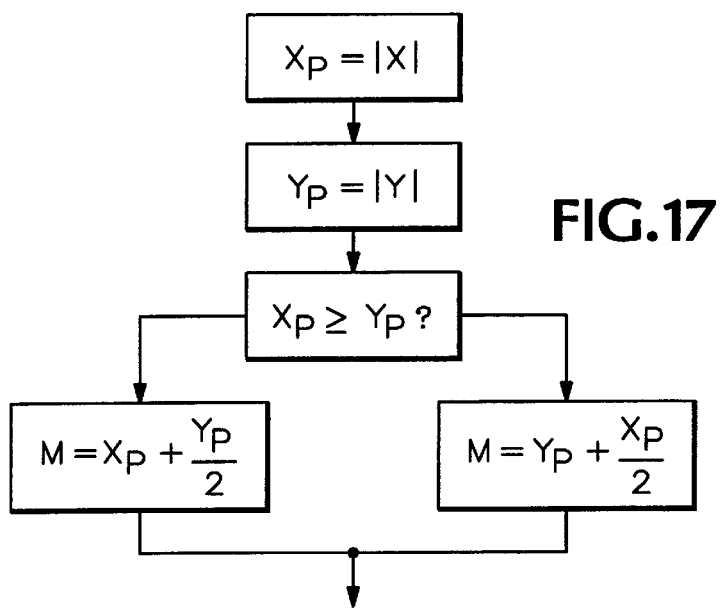
FIG.17
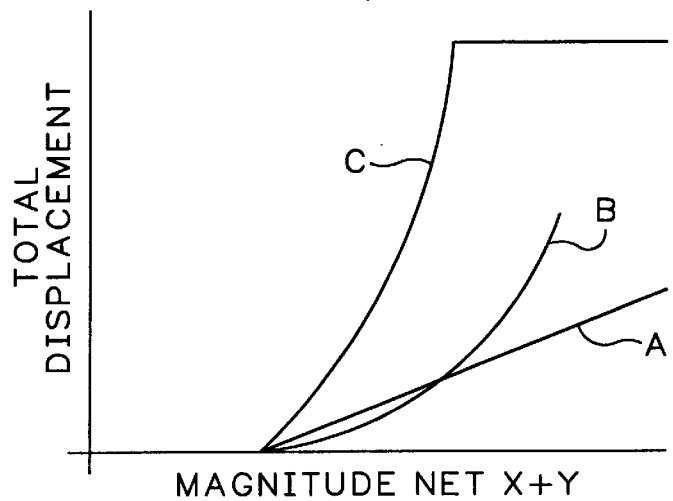
FIG.18

CURSOR TRACKING

RELATED APPLICATIONS

This application is a Continuation of application Ser. No. 07/688,921 filed Apr. 19, 1991, now abandoned, which is a continuation-in-part of commonly-owned application Serial No. 071649,711 entitled INTEGRATED KEYBOARD AND POINTING DEVICE SYSTEM WITH AUTOMATIC MODE CHANGE, filed Feb. 1, 1991 now U.S. Pat, 5,789,403, which is a continuation-in-part of commonly-owned application Ser. No. 07/412,680 filed Sep. 26, 1989 now U.S. Pat. No. 5,124,689. Application Ser. No. 07/649,711 hereby is incorporated herein in its entirety by this reference.

This application also is a confinuation-in-part of commonly-owned application Serial No. 07/557,546 entitled KEYSWITCH INTEGRATED POINTING ASSEMBLY, filed Jul. 24, 1990 now U.S. Pat. No. 5,231,386. Application Ser. No. 07/557,546 hereby is incorporated herein in its entirety by this reference.

This application also is a continuation-in-part of commonly-owned application Ser. No. 07/672,641 entitled DATA ACQUISITION IN A MULTI-FUNCTION KEYBOARD, filed Mar. 18, 1991 now U.S. Pat. No. 5,252,971.

FIELD OF THE INVENTION

This application relates to cursor control on a display screen such as a computer display screen, and more particularly, discloses methods and apparatus for processing pointing data acquired from a pointing device so as to control cursor motion in a natural and ergonomically efficient manner.

BACKGROUND OF THE INVENTION

In the prior art, discrete pointing devices such as a mouse or trackball are used to input cursor displacement information. Such input devices sense displacement, for example changes in orthogonal directions (X,Y), which in turn is used to reposition a cursor on the display screen. Discrete pointing devices are ergonomically deficient in that their use requires a user to move his or her hand away from the usual typing position to begin a pointing operation. Additionally, prior art devices fail to provide good cursor speed control.

U.S. Pat. No. 4,680,577 describes a multipurpose cursor control keyswitch which may be used in a keyboard as both a keyswitch (or typing device) to acquire typing (alphanumeric) data and as a pointing device to acquire pointing (direction) data. That patent discloses sensors coupled to the keycap to detect lateral forces applied to the keycap by a user. Ser. No. 07/557,546 discloses multipurpose keyswitches, i.e. keyswitches that include integrated force sensors for acquiring pointing data responsive to both lateral and vertical forces applied to a keycap, so that a user can enter both typing and pointing data at the same keycap.

Commonly-owned application Ser. No. 07/649,711 discloses a typing and pointing system, as indicated by the title, which automatically switches between a typing mode of operation and a pointing mode of operation, responsive to the user's actions, and without requiring an explicit user command to initiate the mode change.

Acquisition of typing and pointing data from the keyboard in an integrated or multi-function keyboard system, in a manner transparent to application software, is disclosed in commonly-owned application Ser. No. 07/672,641.

One problem in pointing systems in general is overshoot, i.e. moving a cursor beyond the destination intended by the user. Many pointing systems seemtoo fast when the user wants slow, careful pointing and, conversely, seem too slow when the user wants to move the cursor quickly, for example over several inches.

SUMMARY OF THE INVENTION

The present application discloses methods, and apparatus for practicing the methods, of acquiring and processing pointing data to control a cursor. This is referred to as "cursor tracking". Cursor tracking is not limited in application, however, to integrated keyboard systems. Cursor tracking as described herein is useful in any cursor control application, i.e. an application that requires pointing activities, and need not involve processing alphanumeric or typing data at all.

For example, a game control system may include a video display screen and a pointing device such as a mouse or joystick for acquiring pointing data to control a cursor on the display. Cursor tracking is essential to such an application, while typing may be completely absent.

A general object of the invention is to improve the "feel" or ergonomic efficiency of cursor tracking, in part by presenting a model of cursor tracking that is understandable to non-technical users, and allows users to adjust the "feel" or response of a cursor tracking system as necessary.

Another object of the present invention is to control apparent cursor speed responsive to the magnitude of forces applied to a pointing device by a user.

Another object of the invention is to automatically correct for non- linearities inherent in force sensing apparatus, such as force sensing resistors, to improve cursor tracking.

A further object of the invention is to automatically correct for manufacturing tolerances and for aging in force sensing pointing devices to improve accuracy and repeatability of cursor tracking.

Yet another object of the invention is run-time ability to modify cursor tracking characteristics.

The foregoing and other objects, features and advantages of the invention will become more readily apparent from the following detailed description of a preferred embodiment which proceeds with reference to the drawings.

BRIEF DESCRIPTION OF THE DRAWINGS

FIGS. 16A and 16B illustrate combining X and Y force vectors to determine a net XY force vector.

FIG. 17 is a flowchart illustrating a method of approximating a magnitude of a net XY force vector.

FIG. 18 shows illustrative linear, quadratic and composite curves of cursor displacement as a function of applied force magnitude.

DETAILED DESCRIPTION OF A PREFERRED EMBoDIMENT

An integrated keyboard for use in a multi-functonal keyboard system includes an array of directional force sensors positioned under a selected one of the keys so as to form a pointing assembly. Preferably, the selected key is one of the usual typing keys on the home row (ASDF-JKL;) of the keyboard. Alternatively, a special key located alongside the usual array of typing keyswitches may be provided with force sensors exclusively for pointing, but such an arrangement is believed less efficient in use than the preferred arrangement.

The force sensors detect lateral (X and Y axes) and vertical (Z axis) forces applied to the keycap by a user. The addition of these force sensors do not affect the normal operation or feel of the keyswitch. Simple, low cost A/D conversion hardware is provided to convert the signals from the force sensors to digital form for the keyboard microprocessor. Additional software in or available to the keyboard microprocessor is provided to read the A/D hardware and send the resulting sensor data to the host computer. Driver software on the host computer then examines the keyboard data stream and uses the key press/release information and the sensor data to emulate a mouse.

Figure 1:
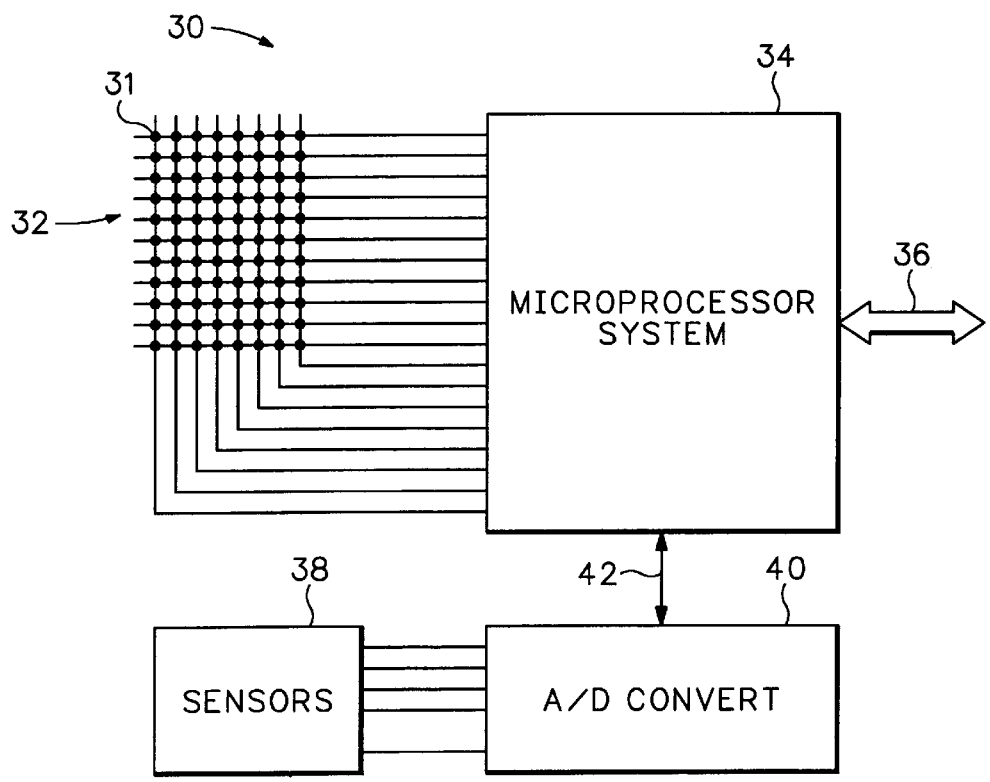
FIG. 1 is a block diagram of an integrated keyboard for input of pointing and typing data.

FIG. 1 is a block diagram of the keyboard hardware 30. It shows an array of keyswitches 32 coupled to a microprocessor system 34, 31 schematically indicates an example keyswitch. The microprocessor system, in turn, is coupled over a communication link 36 to a host processor (computer) as is conventional. Additionally, an array of force sensors 38 is connected to analog-to-digital (A/D) conversion means 40. The A/D converter, in turn, is connected over a bus 42 to the microprocessor. The force sensors, A/D converter and related hardware, and methods of acquiring pointing data using a keyboard of the type described are discussed in greater detail below.

Pointing Force Sensors

The J key preferably is used as the pointing key, as it is actuated by the right hand index finger in the usual typing position. The J key guide is isolated from other guides, and forces on the keycap are coupled through the force sensors to a reference structure. This reference structure is usually a base plate or PCB. The J key plunger still actuates the J key switch in the normal way.

Figure 2:
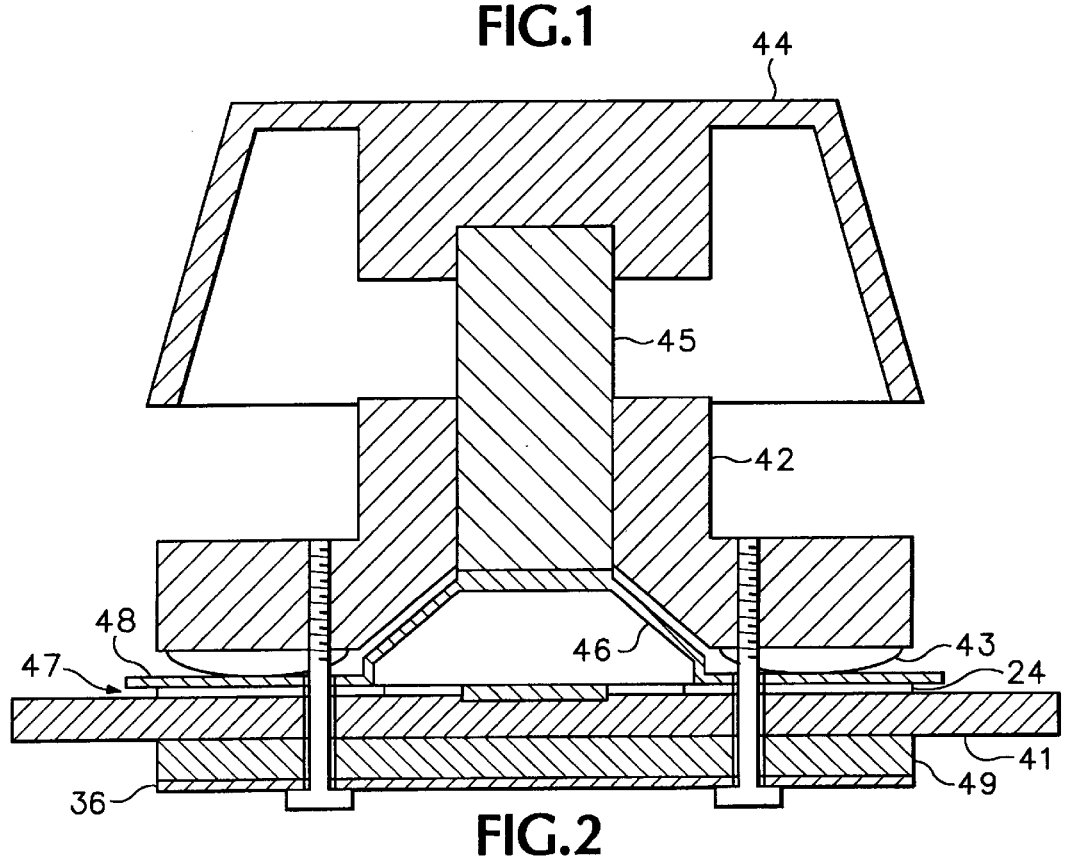
FIG. 2 is a cross-sectional view of a keyswitch-integrated pointing device for use in an integrated keyboard of the type illustrated in FIG. 1.
Figure 10:
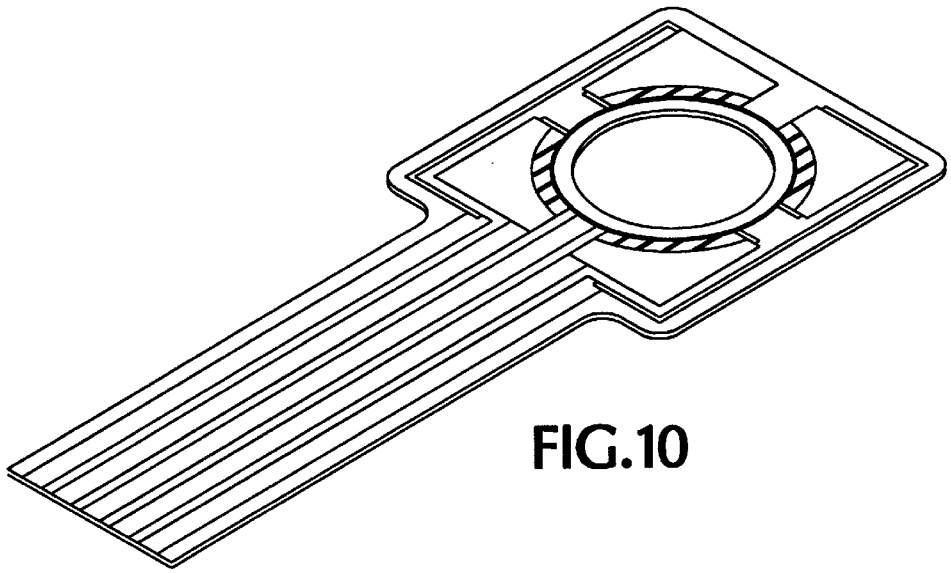
FIG. 10 is a perspective view of a force sensor array of the type employed in the pointing device of FIG. 2.

FIG. 2 illustrates in cross-section an example of a suitable keyswitch fitted with force sensors. A rigid actuator 42 includes a central aperture that serves as a plunger guide, and includes specially contoured actuator surfaces or "pads" 43 on its underside for transmitting forces applied to the keycap to force sensors. A keycap 44 includes a depending plunger 45 for actuating a rubber dome type switch assembly 46. A force sensor array 47 includes a force sensor located below each actuator surface to sense forces applied to the keycap by a user. A perspective view of a force sensor array is shown in FIG. 10. A force distribution pad 48 is disposed between the actuator surfaces and the force sensors. A compressible preload pad 49 biases the sensors to a predetermined operating point Additional details of a keyswitch integrated pointing assembly are disclosed in the copending application referenced above.

The force sensors may employ any of a variety of force sensing technologies. Examples include piezo and foil strain gauges, optical, magnetic and capacitive technologies. Force Sensing Resistors ("FSRs"), a new thick film contact technology, are preferred as they are easy to use, inexpensive, and provide a large output signal. FSRs comprise two plastic films, one with a conductive silver ink and one with a resistive carbon ink. The harder the films are pressed together, the lower the resistance. Resistances range from 500 K Ohms to 5 K Ohms. Since the FSRs are not repeatable under low forces (<150 grams), the useful range of resistances is limited to 20 K to 5 K (approximately 150 to 450 grams). FSRs are commercially available from Interlink Electronics, Inc. of California.

The FSR lays flat on the reference structure and the actuator pads press on four separate areas. This gives four orthogonal resistance signals proportional to the forces on the keycap. In some applications, the four areas are at 45 degree angles to the keyboard, so the signals have to be combined to get XY data.

The actuator is preloaded onto the force distribution pad, thereby biasing the FSR to a point on its force/resistance curve beyond the low force range where the FSR is unstable. In operation, forces applied by a user's finger cause some of the FSRs to be loaded beyond the preload point, and others to be unloaded below the preload point. The preload point is arranged so a approximately 100 g force on the keycap causes a maximum FSR unloading that takes it just to the FSR stability point.

Depending on the particular FSR, the shape of it's force/resistance curve may mean the region of instability, the preload point, and the operating range may be different. For some FSR configurations, the preload point is approximately 12 K and the operating range is from 5 K to 20 K. For others, the curve is shifted upwards, so the preload point might be 30 K, with an operating range of 100 K to 1 K. This is not a problem; the A/D component values just need to be adjusted accordingly for a particular FSR configuration.

The A/D Hardware

Figure 3:
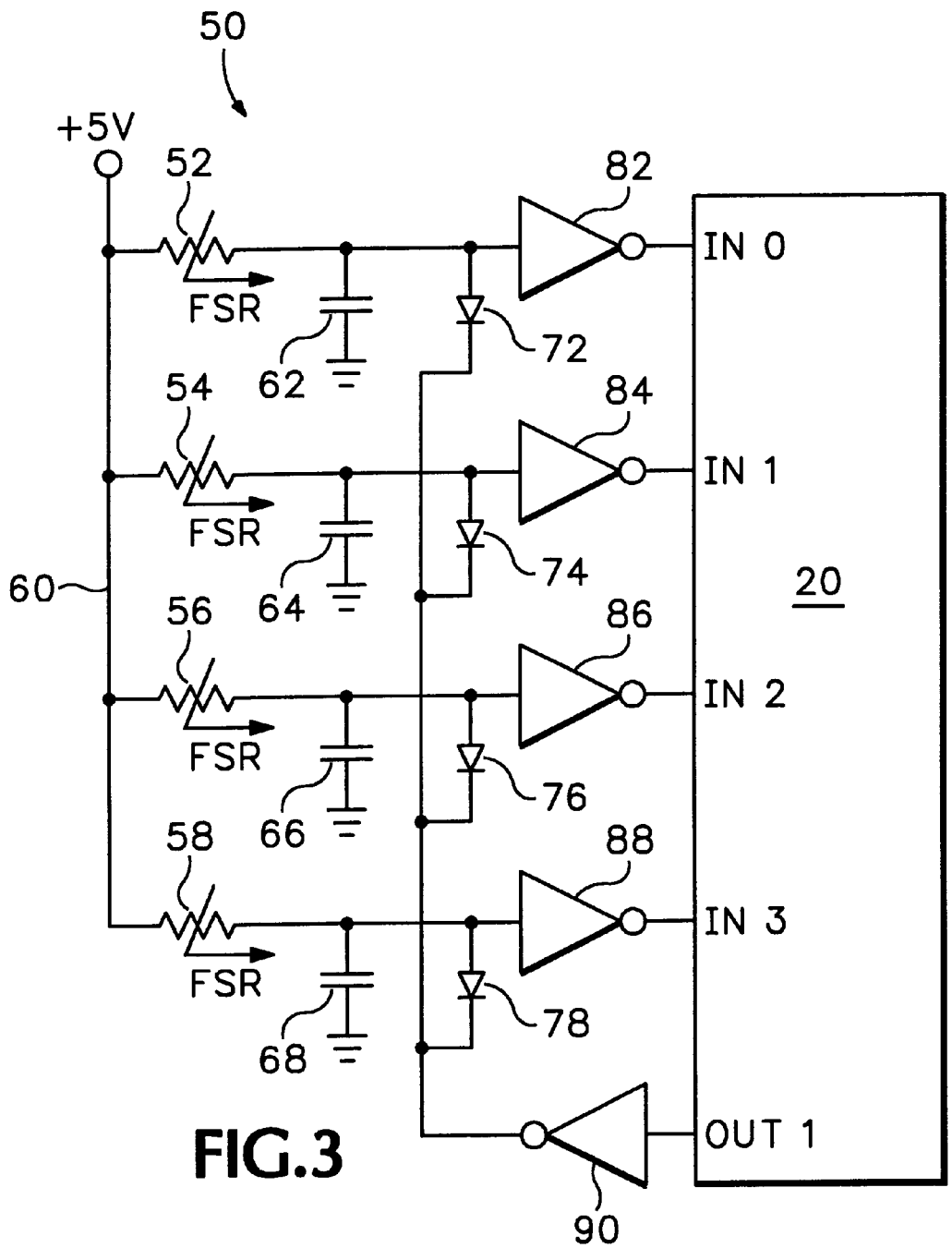
FIG. 3 is a schematic diagram of an array of force sensing resistors (FSRs) coupled to a keyboard microprocessor for implementing a charged-capacitor type of A/D conversion in an integrated keyboard.
Figure 4:
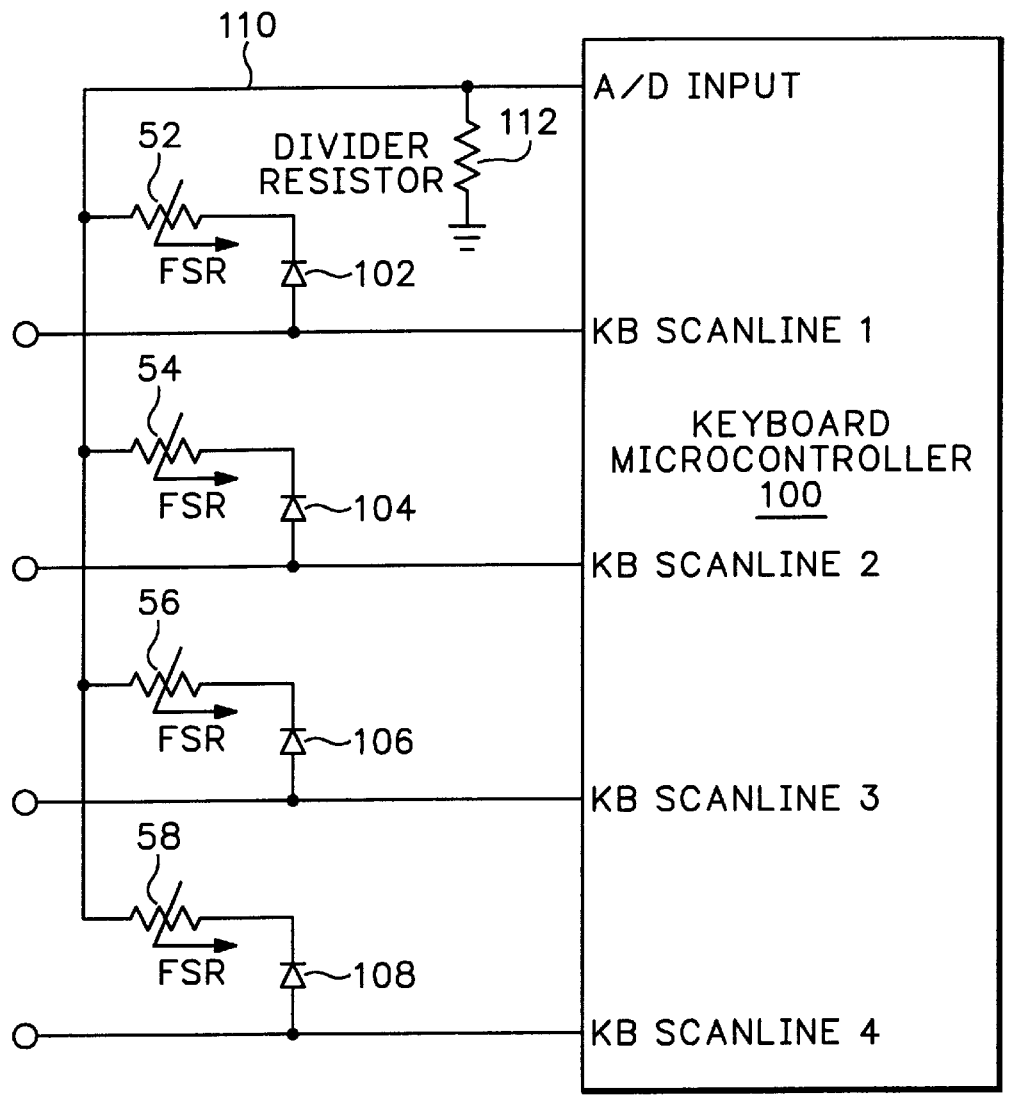
FIG. 4 is a schematic diagram of an array of FSRs coupled to a keyboard microprocessor system that includes an A/D converter for use in an integrated keyboard.

The A/D hardware requirements of the integrated keyboard system are easily met by many different schemes. One operative example of A/D conversion hardware is shown in FIG. 3, described below. A simpler alternative A/D circuit is shown in FIG. 4, for systems with a standard A/D converter in the keyboard microprocessor.

The general specifications for the "A/D" conversion required are:

1. Typical FSR resistance range to be converted: 5 K to 20 K. Actual range is a function of the particular FSR configuration.

2. 7 or 8 bit resolution.

3. 15 conversions/second on each of 4 channels. Three channels are sufficient in an appropriate configuration. A four-channel system may be designed to sense failure of one FSR and continue to operate using the remaining three FSRs.

4. Conversion linearity is not required, especially if 8 bit resolution is provided. FSRs are monotonic but strongly nonlinear, and extensive corrections may be done in host software. Additional correction due to the A/D conversion may be provided.

5. To reduce the size and cost of the FSR and keyboard substrate, it is best to have one side of each of the FSR sensors be connected in common (5 leads for 4 integrated sensors; 4 leads for 3 integrated sensors).

6. Part-to-part consistency needs to be within 10%.

7. Power consumption in operation must be low. Power consumption at idle must be extremely low for use in battery powered applications such as lap top or "notebook" computers.

Charged Capacitor A/D

FIG. 3 is a schematic diagram of an FSR sampling circuit 50, coupled to a keyboard processor 20 for A/D conversion. The basic concept of the sampling circuitry of FIG. 3 is that, for each FSR, a capacitor is charged through the resistance of the FSR. The amount of time required to charge the FSR to a threshold voltage is then measured by the keyboard processor. The charge time is proportional to the FSR resistance.

Referring to FIG. 3, each FSR 52, 54, 56, and 58 has one side coupled to a common node 60. Common node 60 is coupled to a predetermined bias voltage, for example +5 VDC. The other side of each FSR is coupled to a capacitor 62, 64, 66, and 68, respectively. Each capacitor is also coupled to the anode of a corresponding blocking diode 72, 74, 76, and 78, respectively, and to the input of a buffer which may be, for example, an inverter gate 82, 84, 86, 88. The output of each inverter/buffer is coupled to a corresponding data input In0, In1, In2, In3 of the processor 20. The cathodes of the blocking diodes are connected in common to another inverter 90, which is driven by a processor output terminal "Out 1".

In operation, all of the capacitors are discharged before each timing cycle to establish a known reference voltage on the capacitor. As shown, inverter 90 is used to discharge the capacitors via the blocking diodes.

Thus, there is an FSR, a capacitor, a diode, and a thresholding inverter for each channel. The inverter used to discharge the capacitors is shared by all four channels. Depending on the microprocessor used, the thresholding inverters may not be required. To reduce overall A/D time, it is important that the device used to discharge the capacitors have a low internal resistance. A simple transistor is sufficient.

In an operative example, the capacitors are 0.047 uf, the FSR range is 5 K to 20 K ohms, and the maximum charge up time is 1 msec. The timing is done in the keyboard microprocessor software with a 2 instruction loop.

In the embodiment illustrated, there are four sensor channels, one for each of up, down, left, and right. If physical considerations prevent this configuration, host software takes care of creating an XY signal from whatever the sensor configuration may be. In an alternative arrangement, for instance, the FSR sensors are arranged in the four corners of the keyswitch cell, yielding northeast (NE), northwest (NW), southwest (SW), and southeast (SE) signals. We have also found that fewer than four sensors, for example three sensors arranged in a triangle, are adequate for acquiring pointing data. In that case, of course, only three sampling channels are required.

This circuitry is designed for low parts cost and minimal disruption in a standard keyboard application with an existing keyboard microprocessor. It provides adequate resolution at an adequate conversion rate. Five bits of a parallel I/O port on the keyboard microprocessor are required. An alternative arrangement using a timer on the microcontroller would use as little as two parallel port pins and one timer input. Note that using 5 port pins leaves 3 port pins remaining in a standard 8 bit port, sufficient to run a 3 to 8 line decoder, thus effectively allowing for replacement of the 5 pins used.

This circuitry is not ideal for low power operation unless the capacitors are very small because the charges on the capacitors are dumped before each cycle. If the capacitors are small, the time constant will be small and a high speed counter is needed to get adequate resolution. Note, though, that this circuitry only needs to be powered while the system is in pointing mode. The distinction between pointing and typing is explicit, so the sampling circuitry easily could be arranged to power up only when needed.

Microcontroller with Built In A/D

Many different sampling and A/D conversion schemes, including the capacitor charging method described above, may be employed. Other techniques may be apparent to those skilled in the art in light of this disclosure. It is preferred, however, that a microcontroller with built-in A/D be used. Commercially available devices include MC68HC1 1 (Motorola), S80C552, S80C752 (Signetics), and others. Using a built-in A/D converter reduces the conversion time, reduces power consumption, and reduces parts count. A sampling schematic for use with a microcontroller with built in A/D is shown in FIG. 4, described next.

Referring now to FIG. 4, the sampling circuit first converts the FSR resistance to a voltage by means of a voltage divider, formed as follows. Each FSR 52, 54, 56, 58 has one side connected to a common node 110. A divider resistor 112 is connected between common node 110 and ground. Common node 110 is connected to an A/D input of keyboard microprocessor 100.

This fixed leg of the divider should be selected to be near the preloaded FSR resistance. If the preloaded FSR resistances (with no applied loads from a users finger) are about 30 K, for instance, the divider resistor 112 should be about 30 K. Since the FSR resistance change is so great and a common divider resistor is used, the tolerance of the divider resistor is not critical. If the microprocessor 100 has a ratiometric A/D (the MC68HC11, for instance), it is best, but not necessary, that the high and low voltage limits correspond to the maximum and minimum voltages from the divider. The FSR operating range is limited, so the voltage swing out of the divider will not be all the way to Vcc nor all the way to ground.

As shown, each FSR is enabled in turn by existing keyboard scan lines, designated KB Scanline 1 through KB Scanline 4. The particular arrangement shown assumes that the scan lines are normally low and pulse high long enough for the sample and hold in the A/D. It also assumes only one scan line will be high at a time. This is only required when reading the FSRs, not during normal scanning. For applications in which the keyboard uses normally high scanlines that pulse low, one could reverse the diodes and connect the divider resistor to Vcc instead of to ground.

It is of course also possible to use four A/D inputs and four divider resistors. This would eliminate the blocking diodes, any loading the FSRs may place on keyboard scan lines, and any loss of A/D range due to voltage drops.

The minimum series resistance of the FSR/divider resistor is generally high enough that loading is not a problem. An important consideration is the combination of voltage drops across the driver transistors in the keyboard microprocessor 100 and the voltage drops across the blocking diodes. These voltage drops can reduce A/D range by up to 1.4 volts.

Keyboard Microcontroller Software

Figure 5:
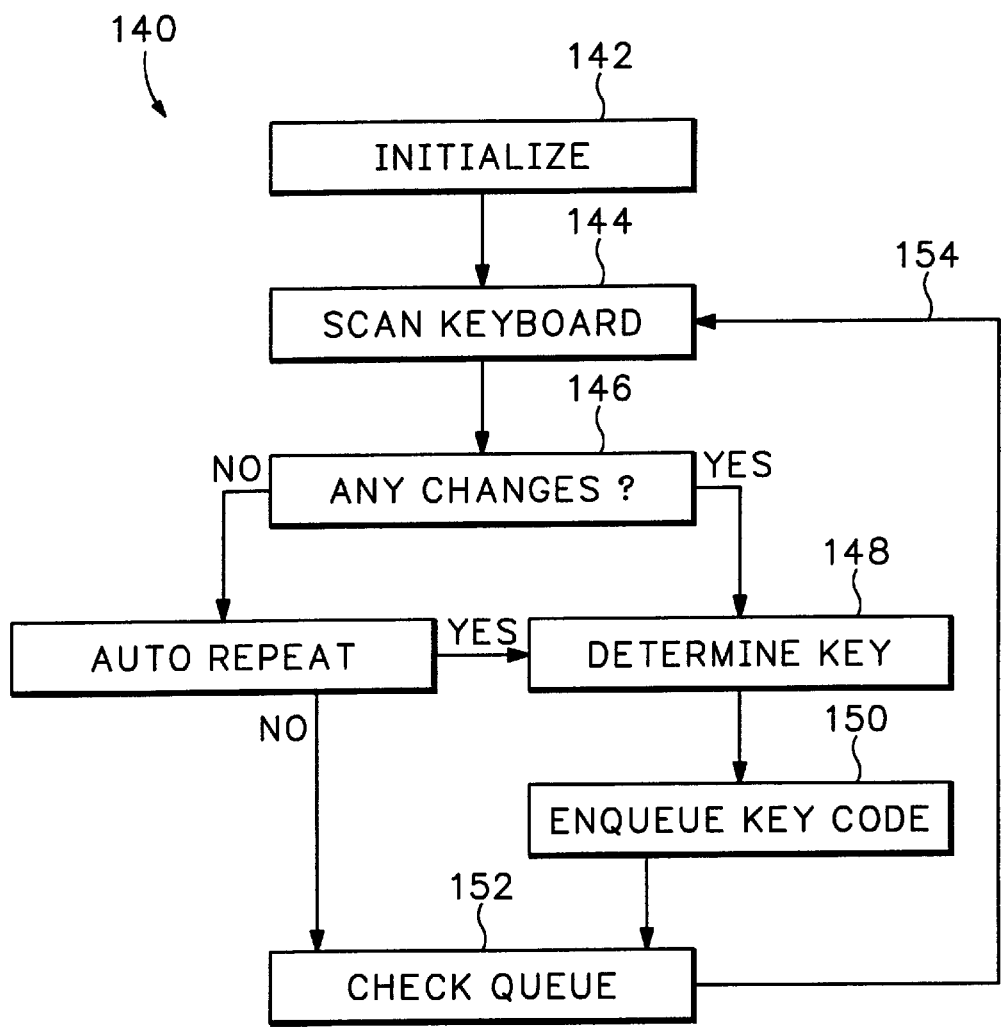
FIG. 5 is a flowchart of a main control loop of prior art alphanumeric keyboard software.

Known keyboard controller software is represented by the flowchart 140 shown in FIG. 5. This software handles acquisition and communication to the host of typing data only. Referring to flowchart 140, after initialization 142, the keyboard microcontroller scans the keyboard 144 and tests for changes in keyswitch states 146. If a change is detected, the key is determined 148, and enqueued 150. The microcontroller then checks the Queue 152 and transmits data, if necessary, to the host. Then the basic scan loop 154 is repeated.

Figure 6:
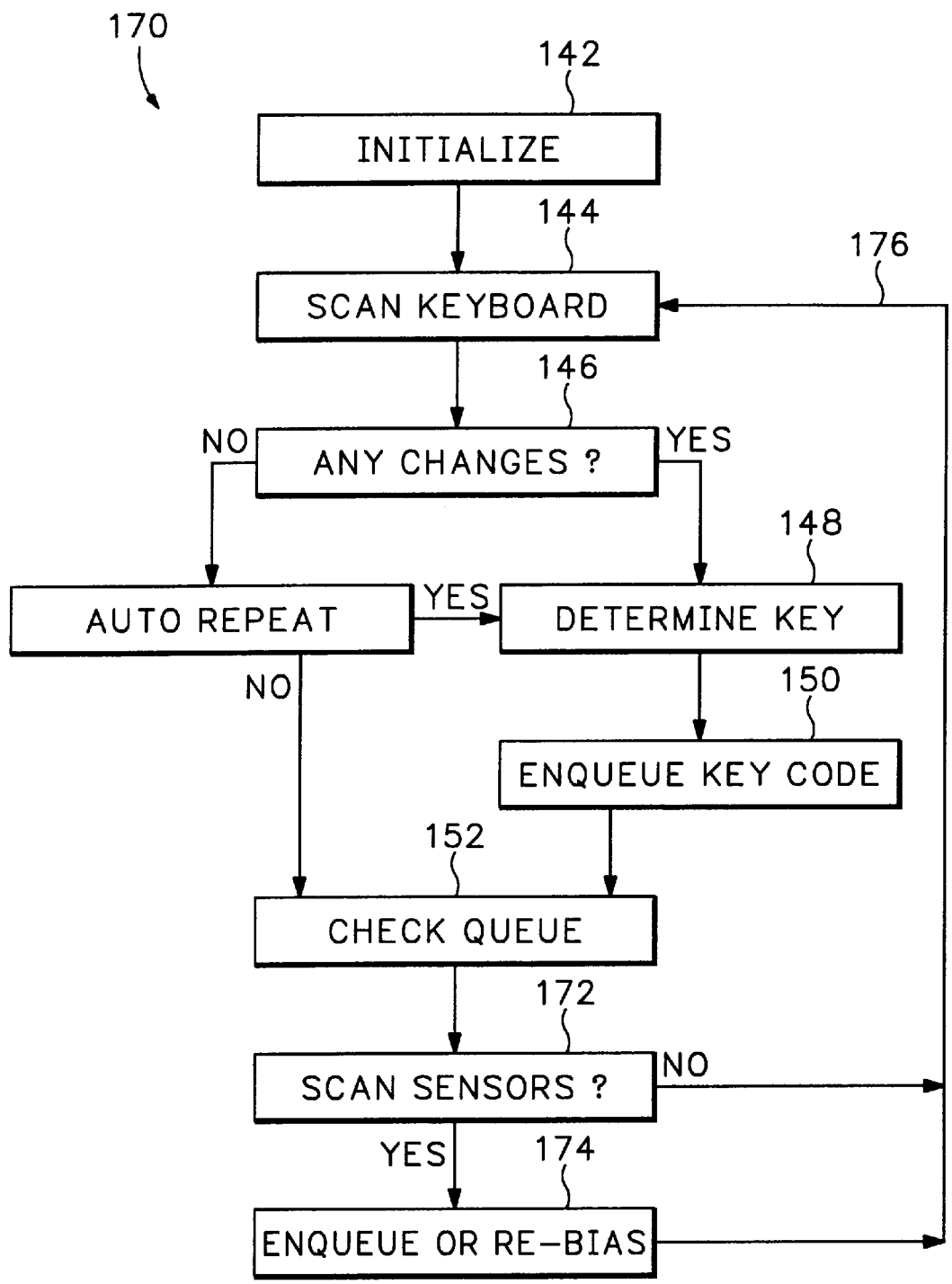
FIG. 6 is a flowchart of main control loop software of an integrated keyboard according to the present invention.

FIG. 6 shows a flowchart 170 of integrated keyboard operations according to the present invention. The upper portion of flowchart 170 is similar to the flowchart 140 of FIG. 5, the same reference numbers being used to identify common elements. The new flowchart 170, however, includes two additional steps following the check queue step 152, namely "Scan Sensors?" 172 and "Enqueue or re-Bias" 174.

Following check queue 152, the processor checks a scan timer flag (set by an interrupt routine) to see if it is time to read the A/D converter to determined force sensor values. If not, control returns, via loop 176, to resume the usual keyboard scanning for keystrokes.

On the other hand, if it is time to do so, the system reads the A/D to acquire force sensor data. Next, in step 174, the system checks a "rebias" flag to determine whether to transmit the force sensor data to the host computer in a data packet, or to use this data to update running bias values for each sensor. If rebiasing, the data is not enqueued. Running bias values are used to cancel drift in the sensors, as further described below.

New Keyboard Commands

The present invention requires that the keyboard microprocessor or microcontroller be arranged to respond to the following new commands from the host processor:

1. IDENTIFY

This command is used at host driver initialization time for the host to determine the keyboard hardware. The preferred command code is DC hex. The keyboard response is described in detail below.

2. START POINTING

A "start sending pointing sensor data" or more simply, start pointing command. The preferred command code is DA hex.

The keyboard responds with an ACK, sends a bias values data packet, a standard data packet, and proceeds to send standard data packets periodically, preferably at 60 millisecond intervals. These data packets are described in detail below.

3. STOP POINTING

A "stop sending pointing sensor data" or more simply, stop pointing command. The preferred command code is DB hex. The keyboard responds with an ACK and stops sending pointing data packets.

At all times the keyboard controller continues it's normal activities of scanning the key matrix and sending keycodes. (See FIG. 6.) The software on the host CPU is responsible for all mode change parsing and all key remappings. The keyboard microcontroller is only responsible for handling the three new commands above.

Figure 7:
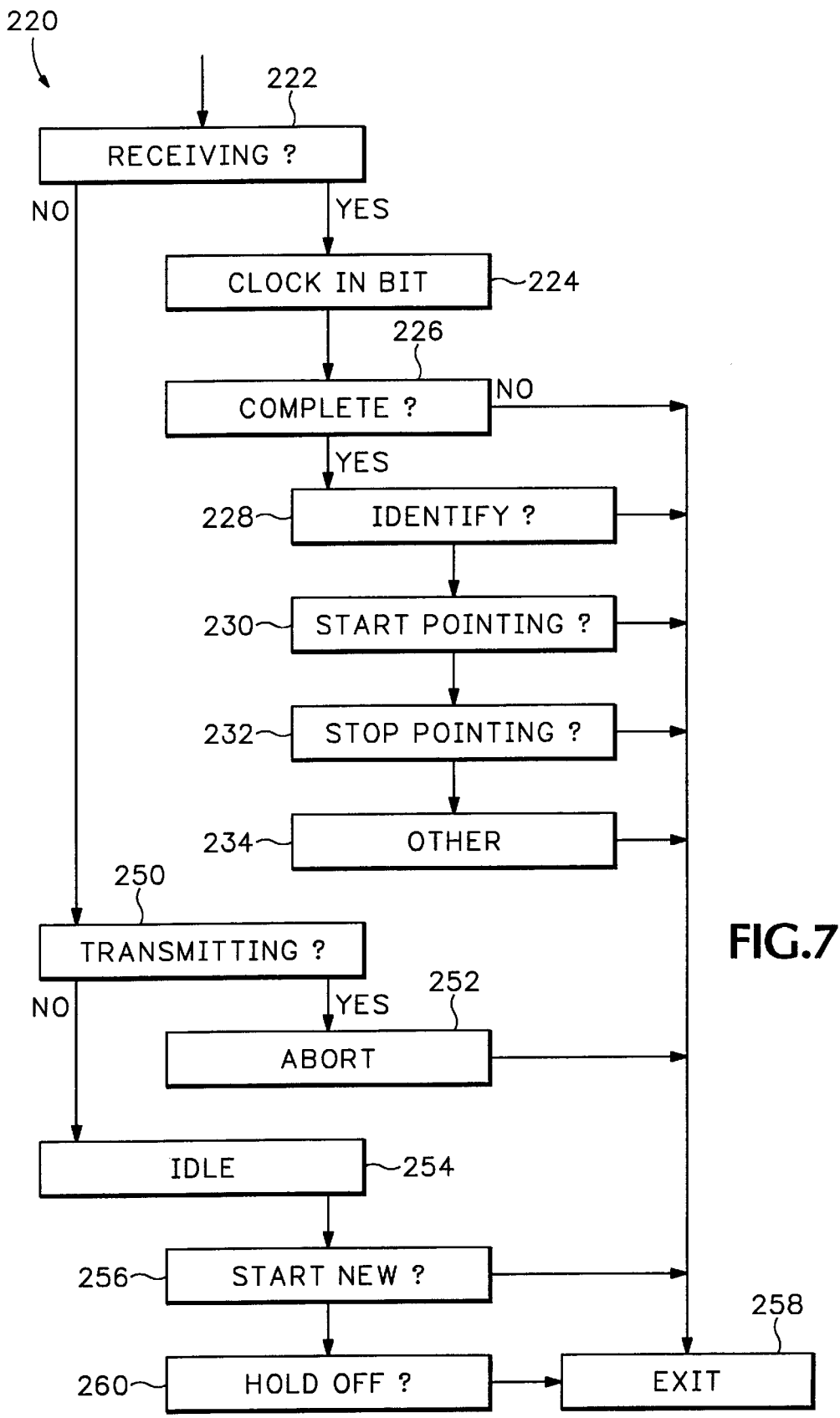
FIG. 7 is a flowchart of a communications interrupt handler for use in connection with the main control loop of FIG. 6.

Referring to FIG. 7, a flowchart 220 is shown to illustrate a communication interrupt handler. The communication interrupt handler preferably is implemented as part of the keyboard software, for communicating with the host processor. A communication interrupt occurs whenever a bit is ready on the communications port from the host computer.

In response to a communication interrupt, the keyboard processor first tests its internal status to determine if it is already receiving (222). If not, the processor tests (250) to determine if it is already transmitting. If the keyboard processor currently is neither receiving nor transmitting, the communication link is idle (254), and the processor next tests (256) to determine whether it is ready to start receiving a new command. If it is ready to start receiving a new command, the processor sets up to do so, and exits the communication interrupt handler (258).

In some keyboard-to-host communications methods, a "hold off" interrupt may occur when the host wishes to prevent the keyboard from starting to send anything. Test 260 tests for this standby status.

Referring back to the top of flowchart 220, if the keyboard system is already receiving when it detects the communication interrupt, it proceeds to clock in the pending bit 224, and then test whether or not the communication is complete 226. If not, control returns from the interrupt handler. This loop (222, 224, 226, 258) will be repeated in response to subsequent communication interrupts to receive subsequent bits until the complete communication, such as a keyboard command, has been received.

When the communication is complete, the keyboard processor examines the received command to identify it. If the received command is the IDENTIFY command, the processor queues up a reply string, and then exits the interrupt handler. If the received command is the START POINTING command 230, the processor sets a pointing flag, starts a scan timer and a bias timer, queues up a bias packet, and then exits. If the command is the STOP POINTING command, the processor clears the pointing flag and the scan timer, sets the bias flag, and then exits. If not, test for other commands 234 which are known in the prior art, and handle them accordingly.

Referring to decision 250, if the keyboard system was transmitting when the communication interrupt occurred, abort transmission 252 to receive the pending bit from the host.

These new features, preferably implemented in firmware, are designed to be as simple, modeless, and transportable as possible. A minimum amount of code space in the keyboard microcontroller is required, and the code does not have to change when the user interface is modified.

The IDENTIFY Command

The IDENTIFY command identifies the keyboard as being a multi-function keyboard, i.e. one having integrated typing and pointing mode capabilities. This allows the host software to make sure that it can work with the software in the keyboard.

The keyboard response to the IDENTIFY command preferably comprises a seven byte sequence. The first byte is a standard ACK (FA), and the second byte is DC hex to identify the response as being from the DC command. The third and fourth bytes are keyboard software version numbers. The fifth byte indicates the sensor type and configuration, while the sixth and seventh bytes identify the key that is physically to the left of the 'A' key on the keyboard (the normal break sequence for the key to the left of A is sent).

The software version is returned in two bytes. Both are encoded values. The first byte is the major software version plus 85 hex. The second number is the minor software version plus 85 hex. A software version of 1.02, for example, would map to encoded software version bytes of 86 87. 85 hex is added to ensure the host keyboard port does not remap the values. Version number codes may range, for example, from 85 H to E9 H, a range of 100 decimal.

The sensor configuration tells the host software what to expect from the sensors, how many there are, etc. It, too, is encoded by adding 85 hex. For example, an 85 (hex) may be used to indicate four FSR sensors under the J key, one in each of the four corners of the key cell. An 86 may indicate four FSR sensors under a dedicated key that emits 6 F/EF when pressed and released. Again, the sensors are in the corners of the key cell. Other codes may be used to identify other sensor configurations, for example three FSR sensors instead of four, as well as to identify other arrangements, such as four sensors orthogonally arranged in line with the keyswitch array matrix.

The key to the left of A is identified so that it can be used for explicit mode change operations by the user. Details of both explicit and implicit (automatic) mode change are described in the commonly-owned applications referenced above, respectively. On PC/AT™ keyboards, this key is usually the CONTROL or the CAPS LOCK key. The upcode sequence (F0 nn) is sent so the host does not mistake the code for a keypress (a mistaken key release is less hazardous).

A typical response to an IDENTIFY command is as follows:

Keyboard Sends: FA DC 86 85 85 F0 58

Host Sees: FA DC 86 85 85 BA

The data is interpreted as follows: "Yes, this is an integrated keyboard" (FA DC); "the keyboard software version is 1.0" (86 85); "the sensor configuration is type 0" (85); and "the key to the left of a is caps lock" (F0 58 maps to BA, or CAPS LOCK up in a standard IBM™ PC/AT™ or compatible system).

Timing Data Acquisition and Communication

Figure 8:
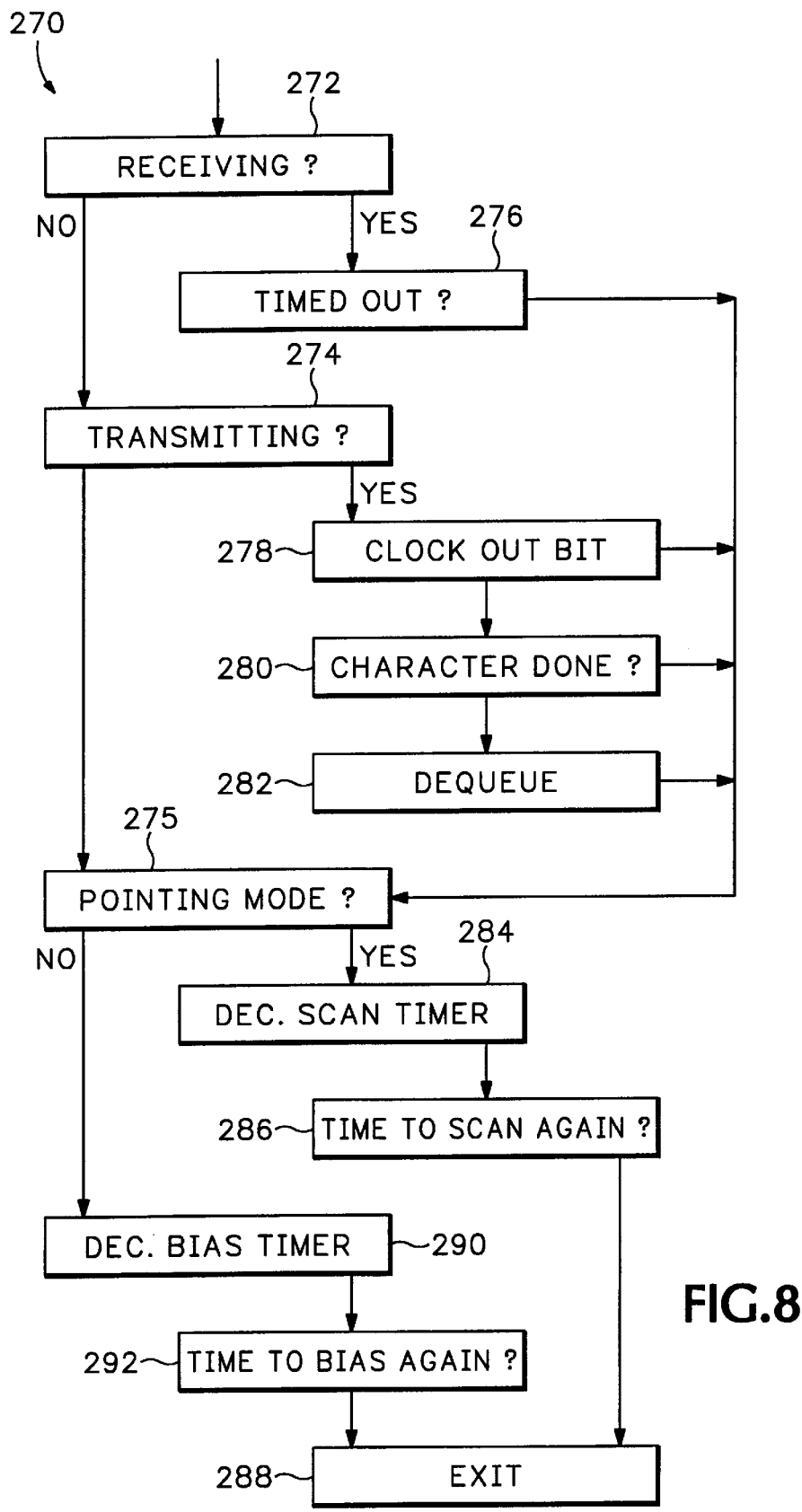
FIG. 8 is a flowchart of a timer interrupt handler for use in connection with the main control loop of FIG. 6.

FIG. 8 is a flowchart 270 of a timer interrupt handler for implementing the present invention. A timer interrupt occurs at a regular predetermined interval, usually triggered by an internal countdown timer feature in the keyboard microprocessor. In the prior art, a timer interrupt handler checks internal status (whether or not the system is currently sending or receiving) and typically performs actions related to communications. These functions are illustrated in the top part of flow chart 270, blocks 272, 274, 276, 278, 280 and 282.

If the system is not currently receiving 272, it tests for transmitting 274. If not transmitting, it tests for pointing mode 275 by checking the pointing flag (see 230 in FIG. 7). If pointing mode, a "packet-to-packet" or pointing count down timer is decremented 284. This is used to pace transmission of sensor data packets, as follows.

Next, the pointing count down timer value is examined 286 to determine if it is time to scan the sensors again, indicated by the pointing count down timer reaching a predetermined value. If so, the system sets the SCAN FLAG and clears the BIAS FLAG. If it is not yet time to scan again, exit 288.

Alternatively, if the system is not pointing (275=NO), a re-bias count down timer is decremented 290 in response to the timer interrupt. Next, the re-bias count down timer is examined 292 to determine if it is time to scan the sensors to update bias values, indicated by the re-bias timer reaching a predetermined value. If so, the system sets the SCAN FLAG and sets the BIAS FLAG. If not, exit 288.

The keyboard system thereby scans for new pointing data at a first predetermined frequency during pointing mode, and scans for new sensor bias data at a second predetermined frequency during a non-pointing (typing) mode. The SCAN FLAG indicates that data needs to be acquired by the main loop shown in flowchart 170. The BIAS FLAG indicates that the data should be used to update the bias values if set and that the data should be sent to the host if cleared. The count down timers are reset when they reach their terminal values.

Reading the A/D for Sensor Values

The reading of the sensor values is highly dependent on the sensor type used, the microprocessor type, and the A/D hardware (on-chip, or one of several discrete methods). For a typical Intel 8048 class microcontroller and a four-element FSR sensor, the A/D typically is a simple "how long does it take to charge a capacitor" type (see FIG. 3). The scanning is done in a two instruction loop, so the time for each channel is about 10+(2*214) or 438 instructions per channel (as described later, the data values range from 0 to 213, so there are 214 possible values for each sensor). Considerably less time is required if a timer input or a built in A/D converter is used (see FIG. 4).

Determining the Sensor Bias Values

If FSR sensors are used, it is important to have an idea of the values from the A/D when the pointing key is not being used. This is because the FSR sensors are preloaded approximately to the middle of their operating range (and the middle of the A/D range), for example by a spring assembly, and any forces applied by the user tends to load some of the FSRs and unload other of the FSRs. As a user applies forces to the keycap, some sensor readings go up, and others go down. Typical non use, idle readings are generally around 100 to 120 out of a possible 214.

The preload is variable over an appreciable range (plus or minus ¼th, or 25% maximum), and to correct for manufacturing tolerances and long term drift, the host software deducts the no-load sensor readings from the in-use (pointing) sensor readings to get a net force indication. The keyboard is responsible for gathering the no-load (bias) readings.

At initialization time, and periodically (every 5 minutes to 15 minutes) thereafter, the keyboard needs to read the individual sensor values and individually average them. Each sensor reading should be ignored if it is more than 12.5% (⅛th) or so different from it's running average. If possible, a reading should be ignored if the pointing key is operated within some short period of time (1 second or so) before or after the reading. This should not be necessary if the running average contains sufficient terms (if the effect of a new reading is weighted so as to not allow it to change the average by more than a certain amount, ⅛th or so).

The sensor bias (no-load) values are accumulated and sent at the start of every pointing session. Bias value data packets may have the same format as pointing (or current) data packets with the exception of an identifying field in the second byte. The host detects the presence of a bias value data packet and updates the host software's internal bias values.

At power-up, the keyboard controller reads the initial null point values and establishes the basis bias values. When the keyboard is told to enter pointing mode and begin scanning, it first sends a data packet which contains the current null point or bias values. This allows the host software to correct for drift due to aging and for variability between keyboards. The flags byte on a null point values packet begins with hex A instead of 9.

Sending Sensor Data Packets

When the keyboard receives the command to begin sending sensor data packets (DA), it does the following:

1. Responds with an ACK (FA), as with any other command (set typematic, sevreset mode indicators, etc.).

2. Send a bias values packet. This is done by enqueuing a bias values packet for automatic transmission.

3. Read the A/D and send a current sensor values packet. This is effected by setting the scan flag and clearing the bias flag. Later sensor values packets are then effected by setting the pointing mode flag and resetting the scan timer.

4. At the same time, continue scanning the key matrix, processing keys, and sending keycodes.

5. Periodically, for example every 60 milliseconds, plus or minus 10 milliseconds (I 5 times a second) read the A/D again and send a current sensor values packet. The repeatability of the time between readings is important—variations will affect the cursor speed.

A sensor data packet is 6 bytes long for sensors with 4 elements. The first byte is an identifier byte of DA, which lets the host know that the next 5 bytes are sensor data, not keycodes (once the DA is sent, nothing should be sent for the next 5 bytes but sensor data). The host will attempt to interpret the next 5 bytes as sensor data, however, if it sees an erroneous value (a value less than 85 hex or greater than EF hex) it will go back to treating the codes from the keyboard as keycodes, starting with the erroneous data code.

There are two types of sensor data packets: bias value packets and current value (pointing) packets. They differ only in the high nibble of the flags byte (hex A for bias values and hex 9 for data values).

The 6-byte packets are arranged as follows:

First Byte: The identifier byte. The value is DA hex. This identifies the start of a reply packet. This is a reserved keycode for the IBM™ PC/AT™.

Second Byte: The flags byte. The upper 4 bits identifies the packet as being a current values or bias values packet, and the lower 4 bits are data value encoding flags, one for each sensor.

If the upper nibble is 9 hex, the packet is a current data values packet. If the upper nibble is A hex, the packet is a bias values packet.

The lower 4 bits are flags that indicate which half of the encoding the following data values are from. For 4 element FSR sensors using the 4 corners of the key cell, the NE flag is bit 3, NW bit 2, SW bit 1, and SE bit 0. This corresponds to the order in which the following data bytes are sent.

Last four bytes: For the last four bytes, the data is encoded as indicated in the following "C" pseudo code:

```
if(value < 0x6B){
    encoded = value + 0x85; /* make start at 85H */
    clear corresponding bit in flags byte
}
else if(value < 0xD6){
    encoded = value + 0x1A; /* make start at 85H */
    set corresponding bit in flags byte
}
else{
    encoded = 0xEF; /* limit to max data value */
    set corresponding bit in flags byte
}
```

Raw sensor values from 0 to 6 A hex (0 to 106 decimal) are mapped to encoded data values of 85 hex to EF hex, with the corresponding bit in the flags byte cleared. Raw sensor values from 6 B to D5 hex (107 to 213 decimal) are mapped to encoded data values of 85 to EF hex as well, but the corresponding bit in the flags byte is set instead of cleared.

Note that this encoding maps the sensor values to innocuous codes that are not remapped by the host AT keyboard port (8042) hardware. The codes used range from 0×85 to 0×EF. Values outside this range are typically used or remapped by the 8042. This encoding allows passing raw data values from 0×00 to 0×D5 (0 to 213) for a total of 214 possible data values.

Third Byte: encoded value of NE sensor

Fourth Byte: encoded value of NW sensor

Fifth Byte: encoded value of SW sensor

Sixth Byte: encoded value of SE sensor

The keyboard AID hardware maps low FSR resistances (high forces) to high values and high FSR resistances (low forces) to low values. The foregoing encoding requires the 8042 keyboard controller to pass these upcodes unmodified.

An illustrative set of interactions with the keyboard is the following:

| From Host: | From Keyboard: |
|---|---|
| DC | FA DC 86 85 85 F0 58 |
| DA | FA |
| | DA A0 C5 C0 C8 C6 |
| | DA 91 89 C0 D8 C5 |
| | DA 90 C5 C0 C7 C6 |
| | . |
| | . |
| | . |
| DB | FA |

Sampling Rate

We have found 15 samples per second to be a useful sampling rate. This encoding thus requires 90 characters per second. The "human loop" delay in this system, i.e. delay for a user to observe an action on the screen (cursor motion or position) and move his or her finger (press the pointing key) to effect a response to the observation is on the order of 400 milliseconds. The sampling rate should be at least sufficient to not add to the human loop delay. A minimum sampling rate for good performance therefore is about four samples per second.

Faster sampling improves visual feedback to the user of cursor motion. The cursor motion has a smoother appearance to the user at a sampling rate of, for example, 20 samples per second. That translates to a sensor data rate of 20 times 6 or 120 bytes per second. For some applications, this rate may be limited by the communication link bandwidth. Such a limitation may be overcome by using one or more of the following techniques.

1. "Double up" data packets using a single byte command.

2. Encode only the difference in the sensor data value since the last packet. In other words, send only a delta value, rather than a absolute value. This can be done in a smaller packet, thereby reducing the data rate proportionately.

3. Use of a special code, one byte long, to indicate a repeat of a preceding byte. A "repeat byte" also is useful to reduce the amount of data required and therefore reduce the necessary bandwidth.

Figure 9:
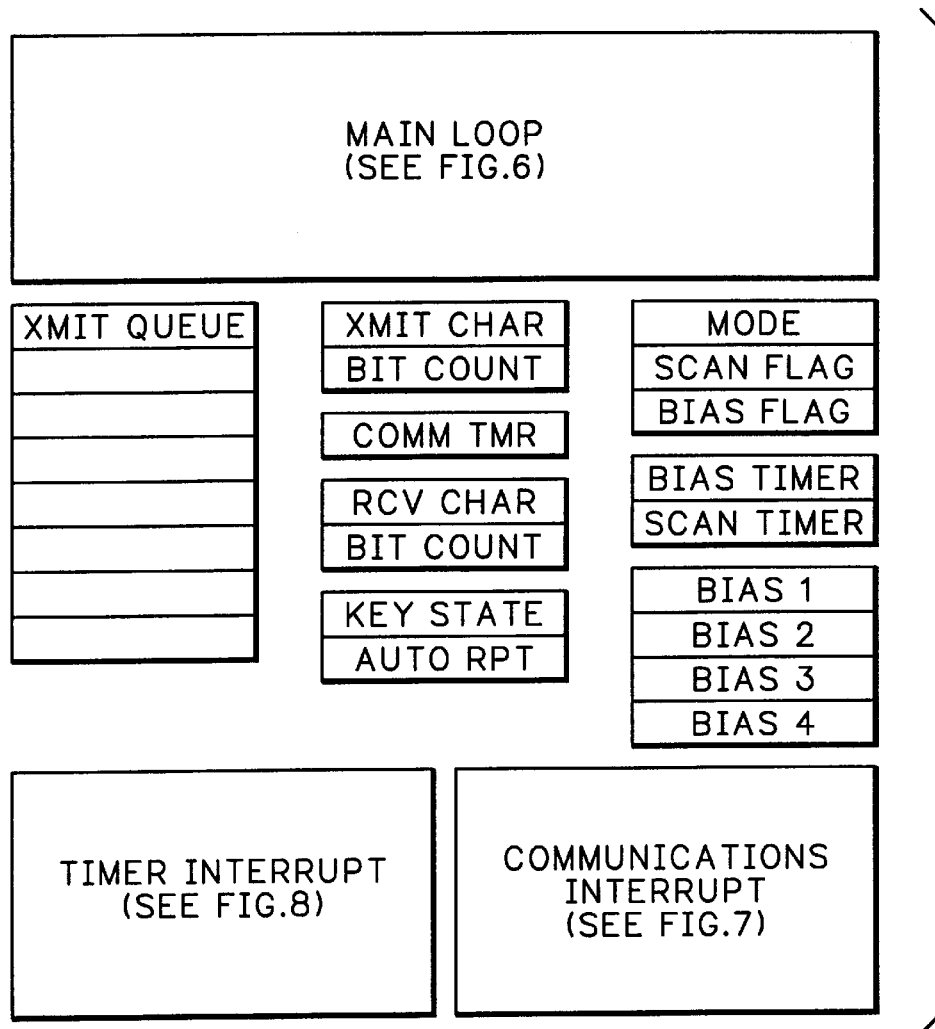
FIG. 9 is a conceptual diagram illustrating the hierarchical relationship of the main control loop of FIG. 6, the interrupt handlers of FIGS. 7 and 8, and pertinent memory locations.

FIG. 9 is a conceptual diagram, showing the methods illustrated in the preceding figures surrounding the various shared data items, shown in the middle. These data items are defined in the following Table:

TABLE 1

Key to Abbreviations Used in FIG. 9

| Abbreviation | Definition |
|---|---|
| Key State | Keyboard key scan state |
| Auto Rpt | Auto Repeat State |
| Xmit Queue | Transmit Queue |
| Xmit Char | Transmit Character |
| Rcv Char | Receive Character |
| Comm Tmr | Communications Timer |
| Mode | keyboard mode flag, i.e. typing or pointing |
| Scan Flag | The flag to indicate to the main loop (FIG. 6) that a sensor scan should be done. |
| Bias Flag | The flag to indicate whether the scanned sensor data should be transmitted or used to auto bias. |

TABLE 1-continued

Key to Abbreviations Used in FIG. 9

| Abbreviation | Definition |
|---|---|
| Bias Timer | The timer for the control of bias data scanning. Invented art. |
| Scan Timer | Timer for packet to packet sensor data timing. Invented art. |
| Bias n | Storage for the current bias values, one for each sensor. |

Null Point Sensor Bias Values

The keyboard controller keeps a "null point" or bias value for each FSR to allow for drift correction. Periodically during typing mode, the keyboard controller will read the FSRs and update the null point values. For each sensor, the new null point value will be averaged into the running null point value unless the new null point value is different by more than 12.5% (1/8th). If the difference is more than 12.5%, the new null point value will be assumed to be in error. The keyboard controller will also ignore new null point values that are taken within a few seconds of the pointing ( ) J key being pressed.

Host Driver Software Overview

The Host Driver Software reads the keyboard port, parsing mode changes between typing and pointing. While in pointing mode, the driver provides a mouse interface.

While in typing mode, the driver has merely to examine the keyboard data stream for the sequences that indicate a change to pointing mode. If the keyboard data is anything else (typing data), it is processed in the normal way.

If the keyboard data indicates a change to pointing mode, the driver tells the keyboard to begin sending AID data, as described above, and proceeds to interpret the keyboard data accordingly. The pointing data is processed as detailed below.

Key press and release information is used in pointing mode to emulate mouse buttons (preferably the F, D, and S keys, though any keys could be used) and to provide useful new pointing device features. New features include real time cursor speed range changing and useful keys such as INSERT and DELETE remapped to keys that are reachable from the home row. Selected other keycodes may be processed as in typing mode. Most other keycodes are thrown away.

While in pointing mode, the driver parses for mode changes back to typing mode. When one is found, the keyboard is told to stop sending sensor data (by sending a DB hex command).

Mode changes may be requested, for example, by the following key sequences (where "LOA" means key to the left of 'A'): {LOA down, J down, LOA up} =enter temporary pointing mode; {J up} then means leave pointing mode. {ALT down, J down, ALT up} =enter locked in pointing mode; {ALT down, J down} =leave locked in pointing mode. Alternatively, special methods may be used to determine if presses of the pointing key are attempts to type or attempts to point (automatic mode change). Note that the keyboard does not have to parse these transitions.

While pointing, the F key is the primary mouse button; D is the secondary mouse button; and S is the third mouse button. Various other keys are remapped under user control:

G is DEL; E is INS; Q is ESC; V is slow down cursor movement; and SHIFT-V is speed up cursor movement. The ENTER, SHIFT, CONTROL, ALT, and CAPS LOCK keys are processed normally. All other keys are ignored. Preferably, the Host Driver software is user configurable as to key placements and mode changes.

Keyswitch Chording

An integrated system according to the invention may use one or more unusual key chordings not commonly encountered in normal typing. It is important, therefore, that no ghosting or lockout occur during these chordings.

To illustrate, the J key is depressed during all pointing operations. The F and D keys are used as mouse buttons, so J, F, and D may all be pressed at the same time. J may also be pressed in conjunction with Tab, Q, W, E, R, T, A, S, G, Z, X, C, V, and B, as well as the normal chording keys, the space bar, and the Enter key. Virtually any other keys may be employed in chords for other purposes.

Host Keyboard Port 8042 Requirements

All the added multi-functional keyboard related communications use keyboard port data values in the range of 85 to EF hex. Normally, these are upcodes. The keyboard, however, is not sending the "up" prefix (F0 hex) prior to these values; it just sends the values. The host computer's 8042 keyboard port must not remap values in this range.

It is a requirement that if the keyboard sends an 85, the keyboard port gives the host an 85. If the keyboard sends an EF, the keyboard port must give the host an EF, and so on, for all values between 85 and EF hex.

Introduction to Processing Pointing Data

Figure 11:
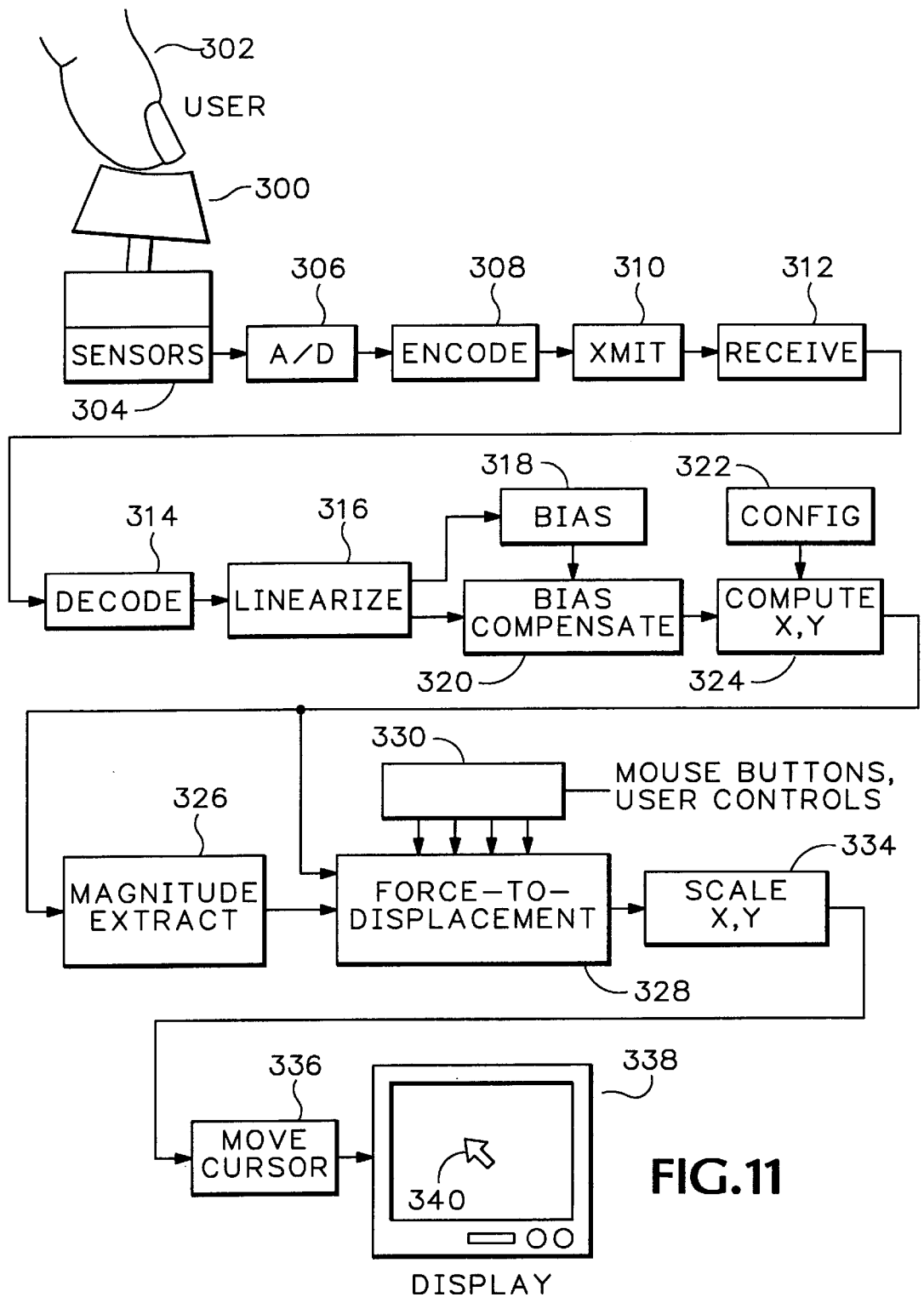
FIG. 11 is a block diagram of a cursor tracking pipeline according to the present invention.

FIG. 11 is an overall block diagram of a cursor tracking system according to the present invention. The diagram shows a keycap 300 operable by a user's finger 302. The keycap may be coupled to a keyswitch-integrated pointing device, such as that illustrated in FIG. 2. Alternatively, the keycap may be coupled to a dedicated pointing device, i.e. one having force sensors but no switch. The keycap is shown coupled to an array of force sensors 304, as described above with reference to FIG. 2, for detecting lateral as well as vertical forces applied by the user's finger.

Sensors 304 in turn are coupled to A/D apparatus, for example as described above with reference to FIGS. 3 and 4, to convert the applied forces to force sensor data. Specifically, the sensors convert force to resistances, and the A/D apparatus converts the resistances to data in the form of A/D output "counts", as further described below. These "raw" force sensor values are encoded 308, transmitted from the keyboard to the host processor 310, received in the host 312, and decoded 314 to recover the force sensor values, as described above.

Each of the raw force sensor values is linearized 316 to form a corresponding linear force value. Next, in the case of a preloaded system, each of the linear force values is compensated 320, responsive to a corresponding force sensor bias value 318, to form a corresponding unbiased, linear force value. The next step is computing an X vector and a Y vector (process 324) by combining the unbiased, linear force values according to their associated directions. The direction associated with each force value is determined by the configuration of the force sensors. The configuration information is acquired by the host from the keyboard, for example during initialization, and stored 322.

The resulting X and Y vectors are combined to form a net XY vector. The magnitude of the net XY vector is computed, process 326. This magnitude is used in force-to-displacement computations, process 328, which also takes into account mouse button status, predetermined speed factor and speed limit values, and other user controls 330. The force-to-displacement computations in turn yield a scaling factor. The X and Y vectors are scaled by the scaling factor, process 334, to form final X and Y cursor displacement values, respectively. These values are used to move the cursor 336, which results in repositioning the cursor symbol 340 on the display screen 338. The resulting change in cursor position will be in the direction of the force applied to the keycap by the user, and over a distance proportional to that user-applied force.

Linearization

The first step in mapping sensor data is to "linearize" 316 the raw force values to form linear force values. Linearization is necessary to correct for anomalies or nonlinearities inherent in the force sensors, the keyswitch-integrated pointing assembly mechanics, and the A/D conversion. The goal is to form a set of force vectors (or a net force vector) that is approximately linearly related to the forces applied to the sensors.

The raw force values represent forces arising from two sources. First are pointing forces, i.e. forces applied to the keycap 300 by the user. A second contributor to the force values are bias forces. Bias forces arise essentially from preloading the sensors, as discussed above. During pointing operations (or pointing mode), the force sensor values represent both user-applied and bias forces. During typing mode (or another non-pointing mode), when the user is not pressing the pointing keycap, the force sensor values represent only bias forces. The same linearization process is applied in both cases, as all force sensor data is acquired in the same way and therefore is subject to the same anomalies. Linearization design requires consideration of the characteristics of the data acquisition system.

Figure 12A:
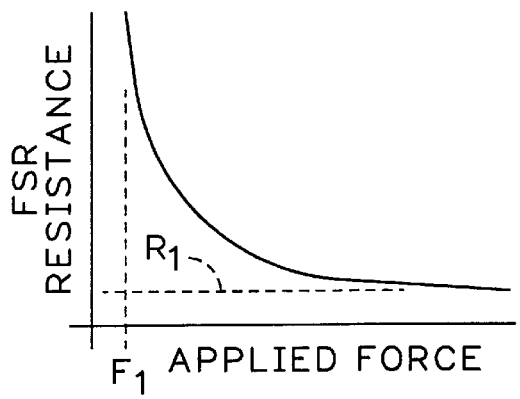
FIG. 12A is a curve illustrating FSR resistance as a function of force applied to a typical force-sensitive resistor (FSR) used for force sensing in a pointing device.

FIG. 12A is a curve illustrating resistance as a function of mechanical force applied to a typical force-sensitive resistor (FSR) used for force sensing in a pointing device. This generally Y=1/X shaped curve falls off rapidly at first, and then stabilizes, as the FSR exhibits a minimum resistance $R_1$ despite increased force. Also significant is that resistance is very high until some minimum or threshhold force $F_1$ is applied. Thus the 1/X curve is shifted upward due to the minimum resistance, and to the right due to the minimum force. The minimum force is typically about 50 grams per FSR, and the minimum resistance is typically about 3 K-ohms. The exact shape of this curve will vary depending upon the particular FSR employed and the mechanical characteristics of the system. The resulting resistance is measured by the A/D circuits described above (see FIGS. 3 and 4).

Figure 12B:
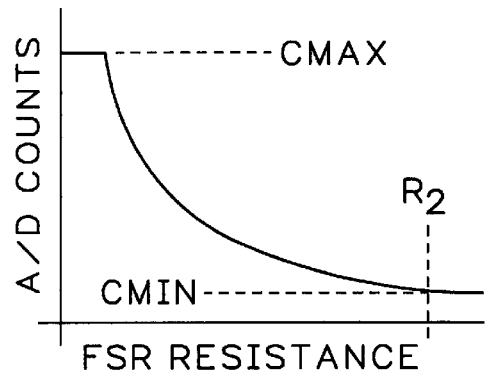
FIG. 12B is a curve illustrating A/D output ("counts") as a function of FSR resistance.

Referring now to FIG. 12B, this curve illustrates an FSR resistance to A/D counts mapping provided by the data acquisition system. This is a generalized curve for the A/D response of both a voltage divider A/D (FIG. 4) and a charged capacitor A/D (FIG. 3) The A/D software is arranged to assign high A/D counts to low resistances (high forces) and to assign low A/D counts to high resistances (low forces). Thus, the curve of FIG. 12B also is a generally (1/X) shape.

The A/D output or count is limited by the software to a predetermined maximum value or A/D count limit, indicated as CMAX. This value is selected to be in a range of about 100% to 200%, preferably about 150%, of the typical operating force range, so it generally is not reached in normal use. In the preferred embodiment, CMAX corresponds to about 4 K-ohms FSR resistance. Additionally, the A/D count is forced to a predetermined minimum value CMIN for all resistance value equal to or greater than a predetermined maximum, indicated as $R_2$. This resistance value is typically around 50 K-ohms. A useful operating range of forces thus is mapped to an A/D count range of CMIN to CMAX. The actual numbers will depend upon the particular implementation. In one operative example, the A/D count range is 0 to 213. See "Sending Sensor Data Packets" above.

Figure 12C:
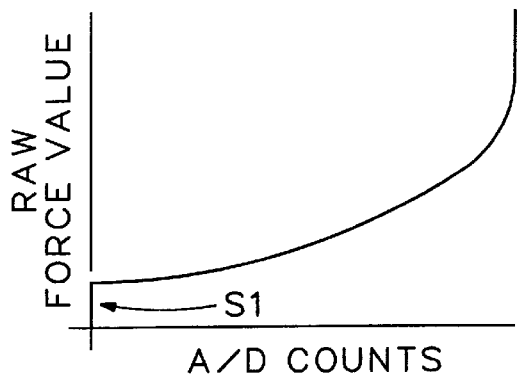
FIG. 12C is a curve illustrating raw force value as a function of A/D counts.

FIG. 12C shows force as a function of A/D counts for an individual sensor. This curve is a result of combining the force to FSR resistance curve (FIG. 12A) and the FSR resistance to A/D counts curve (FIG. 12B). We find that this function is similar to a section of a parabolic curve, offset upwards from the origin and limited to the operating range of A/D counts defined above as CMIN to CMAX. The initial vertical segment S1, in which force increases but the A/D count stays at zero, reflects a range of undetectable forces, typically about 0 to 50 grams, corresponding to $F_1$ in FIG. 12A. Once the FSRs start operating (force>$F_1$), the curve of FIG. 12C exhibits a generally quadratic relationship between A/D count and force, i.e. the A/D count squared is proportional to force.

This roughly quadratic relationship holds true until the A/D count limit (CMAX in FIG. 12B) is encountered. This ensures that user-applied forces are distinguishable over the useful operating range, but forces beyond that are not. In practice, this arrangement is useful for discouraging users from applying excessive forces because they receive no further response. We have found that providing for excessive cursor speed merely facilitates overshoot and therefore reduces pointing efficiency.

For most systems, the force sensors are preloaded to a standby operating point in a range of approximately 40% to 70%, preferably about 60%, of the A/D count range (CMIN to CMAX). Higher preloading tends to unduly age the sensors. When a user applies forces to the keycap, the normal range of operating forces is such that the full range of A/D counts is never reached. Typical operating forces are in a range of 30 to 60 grams down force and 3 to 50 grams side force, resulting in A/D counts from 20 to 190. At rest (standby operating point), preloading results in standby A/D counts of 100 to 140, preferably about 130 (i.e. 60% of full range).

We have found the curve of FIG. 12C to be approximately a quadratic parabolic shape for most combinations of FSR, keyboard mechanics and A/D hardware. Other curves may be fitted more accurately, but a simple, easy to calculate quadratic proves to be quite adequate. The variabilities in FSRs, mechanics and A/D circuitry all tend to cluster around a quadratically fitable curve.

Figure 12D:
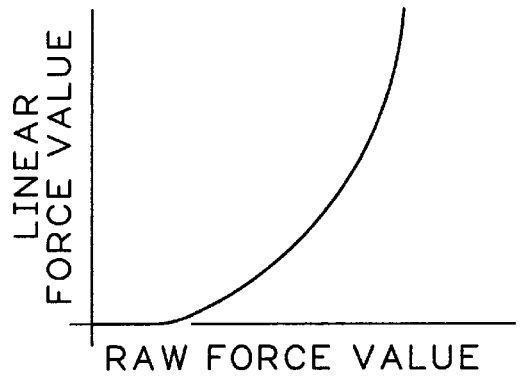
FIG. 12D is a linearization curve illustrating linear force value as a function of raw force value.

In view of the above force response characteristics, i.e. a roughly quadratic function within the allowed operating range of A/D counts, linearization of the raw force values may be effected by use of a quadratic linearization function, generally of the form $ax^2+b$, stated as follows:

$$LFV=(RAW^2 \times LINSQ)+LINOFF$$

where LFV represents the "linearized" or linear force value. RAW represents the raw force value, i.e. the A/D count to be linearized. LINSQ represents a linearization square factor, and LINOFF represents a linearization offset factor. Typically LINOFF is set to 0, as offsets are cancelled during bias compensation, described below. An example of a linearization function of this type is illustrated by the curve of FIG. 12D.

Selection of a value of LINSQ is arbitrary and depends upon the selected range of linearized values. Absolute force values are not important, so arbitrary units may be selected as convenient for calculation purposes. Preferably, the coefficient is selected to result in operation in a range of values that provides sufficient resolution yet is convenient to manipulate in, for example, a 16-bit or 32-bit computer such as a personal computer.

In an operative example of a pointing system according to the invention, A/D values fall in a range of 0 to 213. After squaring, this results in values from 0 to 45,369. This range of numbers requires 16 bits for binary representation. We have found it convenient to use an LINSQ coefficient of 407 with an implicit binary point of 18, i.e. the coefficient actually is 407/218. Ten-bit representation provides sufficient accuracy and eases subsequent calculations.

The linearization calculation described is applied to each raw A/D value to form a corresponding linear force value (LFV). This value is not necessarily strictly linear, but the phrase is used to indicate that a linearization calculation has been done. Referring again to FIG. 11, the linear force values, in the case of bias values, are stored 318 for use in subsequent bias compensation calculations. Pointing mode linear force values are provided to process 320, bias compensation, described below.

Figure 12E:
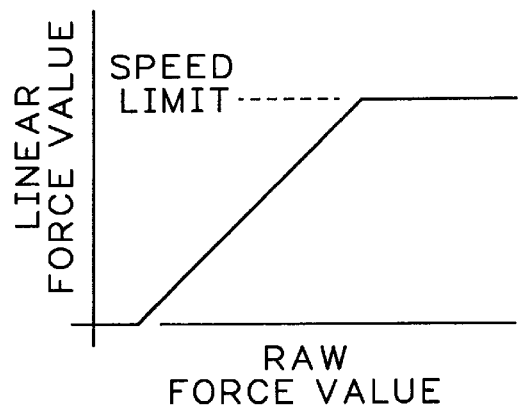
FIG. 12E is a curve illustrating linearized force value as a function of raw force value.

FIG. 12E shows linear force value as a function of raw force value. This is the result of the linearization illustrated by the curve of FIG. 12D. This function Is approximately linear, offset by the null region corresponding to the minimum force $F_1$ in FIG. 12A, and clamped at a value corresponding to the maximum A/D count.

Bias Compensation

The next step In mapping sensor data is adjusting or compensating each linear force value to remove the effect of preloading on the corresponding force sensor. As described above, the force sensors are preloaded to establish a desirable standby operating point. The preload or bias force must be removed from each linear force value to recover the force applied by the user.

Figure 13A:
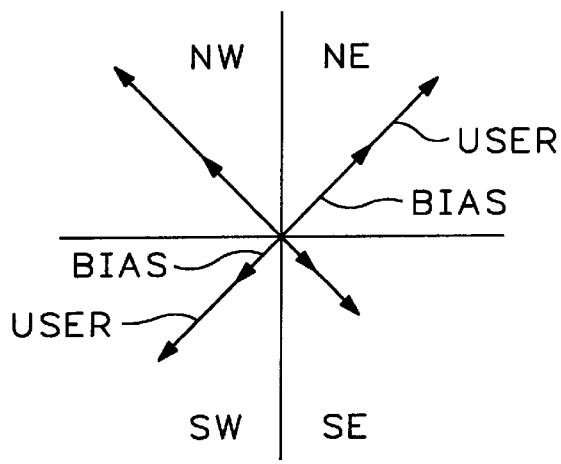
FIG. 13A illustrates force vectors in a four-sensor pointing system, each force vector comprising a bias component and a user component.

FIG. 13A illustrates a set of four orthogonal force vectors. Each force vector has a magnitude represented by the corresponding linear force value, calculated as described above. Each force vector has a associated direction determined by the orientation of the corresponding physical force sensor relative to a predetermined origin.

In a keyboard application, it is convenient to define a cartesian "keyboard coordinate system" in which the positive Y or UP direction is toward the top row of keys as seen by the user. Similarly, positive X or RIGHT direction is toward the user's right, etc. In this illustration, the four force vectors are 45 degrees offset from the axes. These vectors correspond to a set of four orthogonal force sensors arranged in a keyboard 45 degrees offset from the keyboard coordinate system. Each vector thus may be identified by the corresponding compass point (NW,NE,SW,SE). The particular coordinate system used is arbitrary, as it will be communicated to the host and taken into account in cursor tracking, as explained below.

Each force vector in FIG. 13A comprises two segments, a BIAS segment and a USER segment In each case, the BIAS segment begins at the origin and represents the preloading or bias force applied to the corresponding force sensor. The USER segment extends from the tip of the BIAS segment, colinear to it, and represents the user-applied force or, more precisely, a component of the user-applied pointing force along the direction of the corresponding sensor.

Figure 13B:
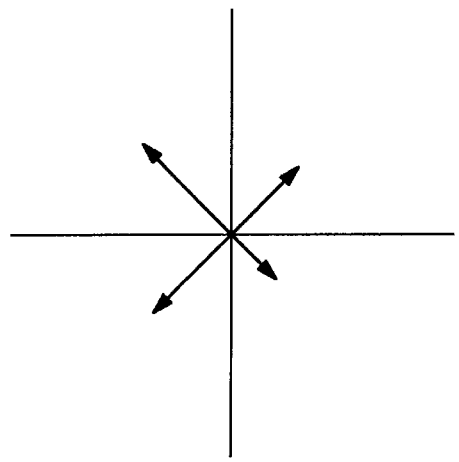
FIG. 13B shows the force vectors of FIG. 13A after compensation to remove the bias components.

FIG. 13B illustrates the four vectors of FIG. 13A after the BIAS vectors have been subtracted, leaving only the USER vectors. Since the BIAS and USER vectors are necessarily colinear, in practice the subtraction may be done by simple scalar arithmetic, i.e. by subtracting a corresponding bias value from each linear force value. (The raw bias values for each sensor, it may be recalled, are measured by the keyboard software and provided to the host processor, for example, at the outset of each pointing operation.) The results of the bias compensation step are the net forces being applied by the user to each sensor.

It should be noted that the results of the bias deduction step can be negative. In other words, the net, linearized force value for a particular sensor may be negative. For example, when the user pushes up, the net output on the down sensor is likely to be negative (also indicating "up"). This provides as much as twice the signal of a strictly positive force system. This is easy to accomodate, as the 10-bit results discussed above would require only 11 bits if doubled, plus a sign bit for negative results, for a total of 12 bits, well within the 16-bit word size of most small computers.

Non-preloaded Sensors

In systems having non-preloaded sensors, low user applied forces may not be detectable. This results in poorer fine cursor positioning control. This can be partially offset by doubling the effect of the opposing sensor (in a four-sensor pointing device) when a particular sensor reads zero. If the "down sensor" in such a 90-degree configuration reads zero, and the "up sensor" has a valid reading, doubling the effect of the "up sensor" partially compensates for the part of the data (the "down sensor" reading) that is lost. This will also tend to smooth the sudden dropping out of one of the sensors. Drop out occurs when the user is smoothly shifting the forces on the keycap, but the A/D count suddenly limits to zero, because force is too low. If this discontinuity is reflected in the cursor movement, the user will be surprised.

Force Vector Combination to Derive Net X and Y Vectors

The next step in mapping sensor data to cursor control is to combine the net (or unbiased) linear force values to derive a net X vector and a net Y vector. See step 324 in FIG. 11. Again, since the directions associated with the sensors relative to an X and Y coordinate system are predetermined, calculating the corresponding force values requires only scalar arithmetic.

Referring now to FIG. 13A, in the case of sensors at 45-degrees, the X and Y vectors are calculated as follows:

X=(NE+SE)−(NW+SW) Y=(NE+NW)−(SW+SE)

Thus, "east" sensor force values are added together, and the combined "west" sensor total is subtracted, to yield a net "east-west" force value for X. The Y components cancel out Likewise, when computing Y, the net "south" value is subtracted from the net "north" value, giving a net Y force value, and the X components cancel each other out.

Figure 14:
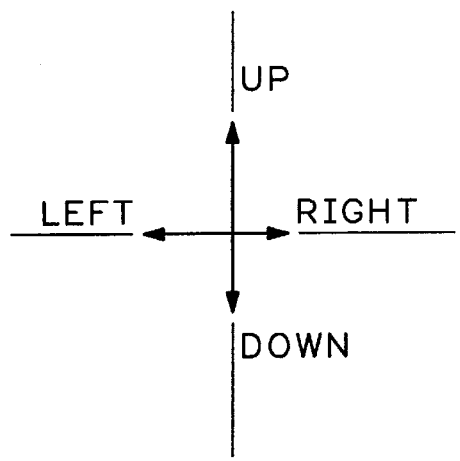
FIG. 14 illustrates force vectors in an alternative four-sensor pointing system.

In the case of sensors aligned with the XY coordinates, as illustrated in FIG. 14, the calculation is similar but simpler:

A net X is computed by subtracting LEFT from RIGHT, and a net Y is computer by subtracting DOWN from UP, where RIGHT, UP and DOWN are the unbiased linear force values acquired from a set of four orthogonal force sensors arranged along the XY axes.

Figure 15:
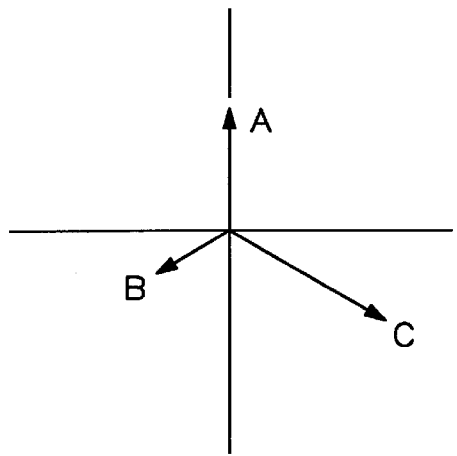
FIG. 15 illustrates force vectors in a three-sensor pointing system.

In the case of a three-sensor pointing system, the sensors preferably are equi-angularly arranged about the origin, with one of the sensors aligned with one of the X or Y axes, as illustrated in FIG. 15. As shown, the A element is on the Y-up axis. For the direction with one element on that axis (here Y), the net force value is the corresponding sensor force value (A) minus (B+C)cos 60. The cosine of 60 is 0.5 which is conveniently calculated by a divide by 2 (shift down once). The other two vectors, B and C in FIG. 15, are 60-degrees off axis, so the X component value is (C sine 60−B sine 60). Therefore X=0.866 (C−B).

The sine of 60 (0.866) is a more difficult coefficient with which to compute. A good approximation is to multiply by 887 and divide by 1024 (which equals 0.8662). Again, the result is a net X vector and a net Y vector. A net vertical force (Z component) can be determined by summing all of the sensor force values, since the user is pushing down on all of the FSR elements.

Net XY Vector Magnitude Computation

The next step in mapping sensor data to cursor control is to combine the X and Y vectors to determine the magnitude of a net XY vector. See step 326 in FIG. 11. FIG. 16 illustrates the vector addition process. It is known that the magnitude of a vector equals the square root of the sum of the squares of the magnitudes of its component (here X,Y) vectors. Square root computations may be cumbersome in some applications, however. Fortunately, the magnitude computation need not be very precise, as it is not as critical as direction is to ergonomic "feel" of the pointing system.

A useful approximation of the magnitude of a net X+Y vector may be caculated by summing the magnitude of the larger vector with one-half the magnitude of the smaller vector. FIG. 16A shows an X (horizontal) vector larger than a Y (vertical) vector. The magnitude of the net X+Y vector is approximated by X+Y/2. Similarly, as illustrated in FIG. 16B, the magnitude of X+Y is approximated by Y+X/2 where X<Y.

This approximation method is illustrated by the flowchart of FIG. 17. It shows (1) determining the magnitude of each of the component vectors; (2) comparing the magnitudes of the two vectors to determine which one is larger; and (3) calculating an approximation of the magnitude of the sum X+Y vector as described above. This approximation Is very easy to calculate and exhibits a maximum error of about 11% at the 26 and 64 degree points. It is also helpful to use |X| and |Y| in the calculation so that the magnitude is always positive.

Force-to-Displacement Functions

The force-to-displacement functions remap the net XY vector to a new cursor displacement. First, the magnitude of the net XY vector is used to compute an intermediate value we will call speed, according to a formula:

speed=SQUARE×(M—NULL)$^2$ +LINEAR×(M—NULL)

where SQUARE is a predetermined square term coefficient, M is the magnitude of the net XY vector, NULL is a predetermined minimum force to initiate cursor motion, and LINEAR is a predetermined linear term coefficient. While this intermediate value does not literally represent cursor speed, it is proportional to the apparent cursor speed that results from the user-applied force, as will become apparent.

This polynomial "speed" evaluation has the following advantages. First, the null value provides a "dead zone" at low forces to hold the cursor at one location. This prevents small variabilities in the pointing system from making the cursor difficult to stop at low user-applied forces (for example forces present due to the user's finger resting on the pointing keycap). Second, the linear term provides for smooth, predictable and controllable small force motion. This term dominates at small forces. And third, the squared term provides for faster movements at high forces but does not have much effect at small force levels. This squared term dominates at high forces.

The squared, linear and null term factors or coefficients may be predetermined and stored in memory. No single set of numbers is ideal for all pointing operations, however. It is very important to ergonomically efficient pointing operations to have not one but at least two sets of these coefficients. For example, a first set of coefficients may be used for dragging operations, i.e. pointing operations during which a mouse button is pressed. A second, different set of coefficients may be used for repositioning operations, i.e. pointing operations during which a mouse button is not pressed.

Thus, according to the present invention, the force-to-displacement function further includes the steps of: providing a first value for use as the SQUARE term coefficient during repositioning operations and a second value for use as the SQUARE term coefficient during dragging operations; checking status of the mouse buttons to determine whether the user is repositioning or dragging; if repositioning, selecting the first value for use as the SQUARE term coefficient for computing the speed value; and, if dragging, selecting the second value for use as the SQUARE term coefficient for computing the speed value, thereby adjusting the cursor tracking responsive to the mouse button status. Note that this substitution of appropriate coefficients in the tracking response is done automatically, i.e. without explicit user intervention. The coefficients are adjusted in response to the user's current pointing activity.

The linear term coefficient may be selected in the same manner as the squared term coefficient. Thus the method includes the steps of: providing a first value for use as the LINEAR term coefficient during repositioning operations and a second value for use as the LINEAR term coefficient during dragging operations; checking status of the mouse buttons; and selecting one of the first and second values responsive to the mouse button status for use as the LINEAR term coefficient in computing the speed value. The null term also may be selected on the basis of the mouse-button status.

Speed Factor and Speed Limit

The next step in the force-to-displacement mappping method is scaling the calculated speed value according to a predetermined speed factor to form a cursor speed value. The speed factor enables the user to keep the same "responsiveness" or "feel" of the system but vary the overall apparent cursor speed. The speed factor is alterable as one of the user controls described below.

Next, the computed cursor speed value is compared to a predetermined cursor speed limit value. The cursor speed limit sets a maximum apparent cursor speed. (It is actually a maximum cursor displacement per cursor update. Since the cursor position is updated periodically, i.e. at a fixed frequency, cursor displacement per update translates to apparent cursor speed.) If the cursor speed exceeds the cursor speed limit, the cursor speed is reduced to the cursor speed limit value. The speed limit prevents the user from moving the cursor faster than the user can control it. This feature is especially useful on LCD screens, where the cursor update rate is low because of the LCD response time.

After speed factor scaling and speed limiting, the resulting cursor speed value is total cursor displacement. In other words, the resulting value is the magnitude of the cursor repositioning called for in response to the user's actions. The cursor position (or repositioning) is controlled by X and Y values, however, rather than a single vector. It remains therefore to scale the X and Y vectors so that the resulting total magnitude of a new net XY vector equals the total cursor displacement value.

The necessary scaling factor is the ratio of the total cursor displacement value to the magnitude of the net XY vector calculated earlier (process 326 in FIG. 11). This ratio, called a scaling factor, is the final result of the force-to-displacement functions 328. An advantage of using different tables depending on the state of the pointing event keys is that, with most application software, the pointing event keys in the released position indicates nothing important is happening. In this situation, the user generally desires to move the cursor as quickly as possible, to reduce the cursor repositioning time. When a pointing event key is pressed, the user is indicating something specific and generally desires to move the cursor in a more controlled manner. Speed is important when the event buttons are not being pressed, and control is important when an event button is being pressed. In practice, it has been found that an approximately quadratic force-to-apparent cursor speed mapping table works best for fast cursor positioning, and that an approximately linear mapping table works best for more controlled cursor positioning. The X and Y vectors are scaled according to the scaling factor, and the resulting X and Y displacement values are used to move the cursor, process 336. Details of the actual cursor driver are known. The result is motion of the cursor image 340 on a the display 338. To summarize, the net cursor displacements are calculated as follows:

(speed×speed factor)=total cursor displacement {limited to speed limit};

total cursor displacement/magnitude net XY vector= scaling factor;

scaling factor×tX=X displacement; similarly, scaling factor×Y=Y displacement.

FIG. 18 shows three curves. Curve A represents the linear term (LINEAR×(M-NULL) in the speed calculation quadratic equation. Curve B represents the quadratic term (SQUARE×(M-NULL)$^2$) in the speed calculation. Curve C represents the aggregate effect, i.e. it illustrates total cursor displacement as a function of M, the magnitude of the net X+Y vector, after speed factor scaling and speed limiting.

User Control of Tracking Functions

It is known in computer science generally to implement mapping or transfer functions by look-up tables. Look-up tables are not optimal forthe present pointing system, however, because such tables require significant memory space. More importantly, look-up tables are difficult to modify as desired by a user. It is difficult to discern by examination of a table which table values are appropriate and which require adjustment. What is needed is an intuitive interface for a user to adjust cursor tracking response.

According to the present invention, run-time controls of the null, linear and squared coefficients used in calculating speed, as well as the speed factor and speed limit values, allow the user to control the system behavior in an intuitive and "user friendly" manner. For example, since the linear term coefficient dominates tracking response for low-force (slow) pointing operations, it is a simple matter to adjust low-force response by adjusting the value of the linear coefficient. This adjustment may be presented to the user not as a technical matter of adjusting the "linear tracking term coefficient," but simply as adjusting "slow pointing response".

A simple (perhaps graphical) interface can be provided for the user to select a parameter that requires adjustment, make an adjustment, and then test the result. For a selected parameter, say high-force response (quadratic coefficient) or speed limit, the user Interface could, for example, display the current setting, an allowable range of settings, and perhaps a default value. The user could modify parameter values as desired. This arrangement allows "customization" of the tracking response at run time, without requiring technical know-how or modification of source code. Several different parameter settings may be stored, perhaps one for each of several users. The corresponding settings would be invoked depending upon who logged into the system.

It is also useful to store related sets of predetermined coefficient values. For example, appropriate values may be stored to allow user selection of low, medium and high "cursor responsiveness" or "acceleration".

| | Coefficient Values | | | |
|---|---|---|---|---|
| | NULL | LINEAR | SQUARE | S.F. LIMIT |
| LOW | 2.0 | 1.5 | 0.3 | 1.0500. |
| MEDIUM | 1.5 | 1.75 | 0.49 | 1.0900. |
| HIGH | 1.0 | 1.75 | 0.60 | 1.21200. |

Operative Example of an Embodiment of the Invention

Following is a specific example of an operative embodiment of the invention. The hardware includes the following:

| Hardware Configuration Example | |
|---|---|
| Keyboard type: | IBM PC-AT compatible |
| FSR configuration: | four elements, 4 degrees offset from cartesian keyboard coordinates |
| FSR model | custom configuration depending upon keyboard mechanics and layout. Includes four FSR elements having 30 k to 4 k-ohm range |
| A/D type, output range: | Charged capacitor type; maps 30 k to 4 k-ohms FSR resistance to 0 to 213 output counts microprocessor/ microcontroller: Intel 8051 |
| Host computer | IBM - AT class compatible |

The values received from the A/D converter range from 0 to 213. This data is linearized, as described above, using the formula:

$$LFV = (RAW^2 \times LINSQ) + LINOFF$$

where LFV represents the linear force value, RAW represents the raw force value, i.e. the raw A/D count; LINSQ represents the linearization square factor, and LINOFF represents the linearization offset factor. Since LINOFF gets cancelled out in the bias step, it is set equal to 0.

During linearization, squaring the 0 to 213 range of A/D counts results in values that range from 0 to 45,369. LINSQ is set to $476/2^{18}$ or about 0.0018158. This results in linear force values (LFV) that range from 0 to 82.4. At this stage, it is necessary to keep values accurate to 2% or so.

In the biasing step, values typically are adjusted to approximately ±30. That is, a linearized bias value is typically about 40, and the linearized overall force values typically range from 10 to 70. Accordingly, the result after linearization, i.e. unbiased linear values, typically range from +30 to −30. Note that this represents an increase or decrease of force on an individual sensor from the standby bias value, respectively.

In the X+Y vector combination step, the ±30 individual sensor values tend to double, as the system is designed such that if one sensor gets an increased load, the opposite sensor will get a decreased load. The vector combination step then typically results in X and Y component values of −60 to +60 for a typical +/−30 range of individual sensor values. Note that +/−60 generally applies to only one axis at a time. In other words, when a user applies a force corresponding to +60 along one axis, it is unlikely to apply a substantial force along the orthogonal axis. During the vector combination step, it is necessary to keep values accurate to 1 or 2 percent. This is because accurate control of the angle of cursor movement is more important than accurate control of cursor speed.

The net X+Y vector magnitude computation step tends to result in values that range from 0 to +60 for X,Y components that range from −60 to +60, using the approximation technique described. This is because a large swing on one axis usually means a small swing on the other axis, resulting in a range of magnitudes approximately the same as the range of individual input values. Worst case, of course, the magnitude could be 1.5 times as much as either magnitude value. In this step, it is desirable to keep the magnitude accurate to approximately 5%. Recall that it may be off by as much as 11% if the approximation described above its used. Importantly, the approximation is continuous. Discontinuous errors, such as those resulting from truncation of real numbers, are more likely noticed by the user.

The force-to-displacement calculation proceeds as follows:

$$speed = speedfactor\ (SQUARE(M-NULL)^2 + LINEAR(M-NULL))$$

1 5 If speed is greater than speed limit, then set speed equal to speed limit, scale factor=speed/M, where 'M' is the computed magnitude of the XY vector (typically 0–60 range).

| Typical Coefficient Values | |
|---|---|
| Typical values for the coefficients are: | |
| speed factor: | 1.0 |
| SQUARE: | 0.492 |
| NULL: | 1.5 |
| LINEAR: | 1.75 |
| speed limit: | 921. |

1/8th mickeys per cursor movement (A position change).

Therefore X+Y input magnitudes of over 42 trigger the speed limit. For a typical range of input 30 magnitudes from 0 to 60, the speed ranges from 0 to about 22, peaking at 22 for input magnitudes of about 42.

After multiplying the original XY vector by the scale factor, typical results range from −921 to +921. The resulting total displacement vector (having components from −921 to +921) represents the number of ⅛ths of a mickey per cursor movement. In mickeys, the range is about −115 to +115 mickeys in X and Y. We have found it necessary to hold mickey movements accurate to within about ¼th of a mickey to ensure good shallow angle tracking. Preferably, accuracy is within approximately 1/64th mickey.

At 30 cursor updates per second, this results in a maximum of 115*30 or 3450 mickeys per second. On a typical display screen, this corresponds to a maximum cursor image speed of about 56 inches per second. This cursor speed exceeds the maximum speed that user's are capable of tracking visually according to the literature. User's generally dislike speed limits initially, perceiving the system to be insufficiently responsive to their pointing actions. User's sometimes prefer to move the cursor faster than they can track it, although the resulting overshoot is not most efficient.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. In an integrated keyboard coupled to a display having a cursor, the keyboard having an array of typing keyswitches that includes a multi-purpose pointing key and a plurality of force sensors coupled to the pointing key, each force sensor having an associated direction and the force sensors providing sensor signals having a non-inear relationship to force applied to the force sensors, a method of acquiring pointing signals for repositioning the cursor comprising the steps of:

providing means in the keyboard for selecting one at a time of a typing mode of operation for acquiring typing signals and a pointing mode of operation for acquiring pointing signals;

when the keyboard is not in pointing mode, periodically scanning each of the force sensors to acquire a corresponding force signal defining a sensor bias signal;

during a pointing operation, periodically scanning each of the force sensors to acquire a corresponding force signal defining a pointing signal;

linearizing the acquired sensor bias signals and the acquired pointing signals so that the linearized signals have a generally linear relationship to force applied to the sensors at the time said signals were acquired;

deducting each linearized force sensor bias signal from the corresponding linearized pointing signal to form respective net pointing signals;

combining the net pointing signals according to the associated directions of the corresponding force sensors; and repositioning the cursor responsive to the combined net pointing signals.

2. In a cursor control system, a method of converting forces applied by a user to cursor displacement data for controlling cursor repositioning on a display screen, comprising the steps of:

providing a force-sensitive pointing device including a plurality of force sensors each having a respective associated direction, for receiving external forces applied by a user pressing on the pointing device;

applying a bias force to each of the force sensors so that each sensor exhibits a bias electrical signal while no external force is applied to the pointing device by the user;

while no external force is applied to the pointing device, acquiring sensor signals from each of the pointing device force sensors, thereby determining respective force sensor bias signals;

while an external force is applied to the pointing device by the user, acquiring sensor signals from each of the pointing device force sensors, thereby determining respective raw force signals, the raw force sensor signals having a non-linear relationship to the applied external force;

linearizing the force sensor bias signals and the raw force signals so as to form linearized bias signals and linearized raw force signals, respectively, each having a generally linear relationship to the bias signals and the raw force signals, respectively;

compensating each of the linearized raw force signals responsive to the corresponding linearized bias signals to form linearized, unbiased force values;

combining the linearized, unbiased force values according to their associated directions so as to form a horizontal signal and a vertical signal; and repositioning the cursor in the horizontal and vertical directions on the display screen, responsive to the horizontal and vertical signals, respectively.

3. A method according to claim 2 wherein said combining step includes:

combining the linearized, unbiased force values according to their associated directions so as to form a net XY vector;

computing a magnitude M of the net XY vector to represent a total lateral force applied by the user;

computing a speed value according to a formula:

$$\text{speed} = \text{SQUARE} \times (M - \text{NULL})^2 + \text{LINEAR} \times (M - \text{NULL})$$

where

SQUARE is a predetermined square term coefficient,

M is the magnitude of the net XY vector,

NULL is a predetermined minimum force to initiate cursor motion, and

LINEAR is a predetermined linear term coefficient, thereby converting the force sensor data to form the speed value;

repositioning the cursor on the display screen by a distance proportional to the speed value; and repeating said repositioning step periodically thereby moving the cursor with an apparent velocity proportional to the speed value.

4. A method according to claim 3, the system also having a mouse button for distinguishing dragging operations from cursor repositioning operations, and further comprising:

providing a first value for use as the SQUARE term coefficient during repositioning operations and a second value for use as the SQUARE term coefficient during dragging operations;

checking status of the mouse button to determine whether the user is repositioning or dragging;

if repositioning, selecting the first value for use as the SQUARE term coefficient for computing the speed value; and if dragging, selecting the second value for use as the SQUARE term coefficient for computing the speed value, thereby adjusting the cursor tracking responsive to the mouse button status.

5. A method according to claim 4 wherein the first value is greater than the second value so that the computed speed value is greater for a repositioning operation than for a dragging operation.

6. A method according to claim 3 further comprising:
providing a first value for use as the LINEAR term coefficient during repositioning operations and a second value for use as the LINEAR term coefficient during dragging operations;
checking status of the mouse buttons; and
selecting one of the first and second values responsive to the mouse button status for use as the LINEAR term coefficient in said computing the speed value.

7. A method according to claim 3 further comprising:
providing a first value for use as the NULL force value during repositioning operations and a second value for use as the NULL force value during dragging operations;
checking status of the mouse buttons; and
selecting one of the first and second values responsive to the mouse button status for use as the NULL force value in said computing the speed value.

8. A method according to claim 3 further comprising:
providing a predetermined speed factor for user control of the overall apparent cursor speed; and
scaling the speed value according to the speed factor to form a cursor speed value;
and wherein
the horizontal and vertical signals are adjusted according to the cursor speed value rather than the speed value.

9. A method according to claim 8 further comprising:
providing a predetermined cursor speed limit value for limiting the apparent cursor speed to a desired maximum to control overshoot of the cursor on the display screen;
comparing the cursor speed value to the cursor speed limit value; and
if the cursor speed value exceeds the cursor speed limit value, reducing the cursor speed value to the cursor speed limit value, thereby determining a total cursor displacement value.

10. A method according to claim 8 further comprising:
determining a ratio of the cursor speed value to the magnitude M of the net XY vector, thereby forming a scaling factor; and
scaling each of the unbiased force values by the scaling factor to form X displacement and Y displacement values, respectively; and wherein said repositioning the cursor includes updating cursor position by the X and Y displacement values; and
repeating the foregoing steps to control cursor motion responsive to the acquired sensor data.

11. A method according to claim 3 wherein computing the magnitude of the net XY vector comprises:
determining a larger one of the X vector and the Y vector; and
summing the magnitude of the larger vector together with one-half the magnitude of the other (smaller) vector to form an approximation of the magnitude of the net XY vector.

12. A graphic cursor positioning device comprising:
force sensor means responsive to operator actuation to generate a first pair of cursor movement electrical signals, each of the first pair of cursor movement electrical signals having an associated direction;
signal processing means acting upon the first pair of cursor movement signals to produce a corresponding second pair of cursor movement signals;
display means for presenting a moveable cursor;
cursor generating means connected to said display means so as to cause movement of said cursor in correspondence to said second pair of cursor movement signals;
said signal processing means including means for providing differing time response characteristics of said cursor movement in correspondence to said operator actuation, the time response including a faster cursor movement while the operator actuation is a repositioning operation and a slower cursor movement while the operator actuation is a dragging operation.

13. A graphic cursor positioning device according to claim 12 wherein said signal processing means includes a mouse button status memory for determining a present state of a mouse button, a mouse button down state indicating a dragging operation and a mouse button up state indicating a repositioning operation, so that the response of the cursor to the operator actuation depends upon the state of the mouse button status memory.

14. In a cursor control system, a method of converting forces applied by a user to cursor displacement data for controlling cursor motion on a display screen, comprising the steps of:
providing a force-sensitive pointing device including a plurality of force sensors each having a respective associated direction, for receiving external forces applied by a user;
biasing the pointing device by applying a bias force to each of the force sensors so that each sensor exhibits a bias force when no force is applied by the user;
while no external force is applied to the pointing device, acquiring sensor data from each of the pointing device force sensors, thereby determining force sensor bias values;
while external force is applied to the pointing device by the user, acquiring sensor data comprising raw force values from each of the pointing device force sensors;
linearizing each raw force value to form a linear force value, said linearizing step including:
providing a predetermined linearization square coefficient (LINSQ);
providing a predetermined linearization offset coefficient, (LINOFF); and
computing the linear force value according to the formula:

$$LFV=(RAW^2 \times LINSQ)+LINOFF$$

where LFV represents the linear force value,
RAW represents the raw force value,
LINSQ represents the linearization square factor, and
LINOFF represents the linearization offset factor;
compensating each of the linear force values responsive to the corresponding force sensor bias value to form a corresponding unbiased force value; and then combining the unbiased force values according to their associated directions so as to form a horizontal signal and a vertical signal for repositioning the cursor in the horizontal and vertical directions, respectively, on tbhe display screen.

15. In a cursor control system, a method of converting forces applied by a user to cursor displacement data for controlling cursor motion on a display screen, comprising the steps of:

provepting a force-sensitive pointing device for receiving external forces applied by the use, the pointing device having four orthogonal force sensors disposed offset forty-five degrees from a predetermined cartesian coordinate system, so that each of the force sensors corresponds to one of NE,SE,SW and NW directions relative to the cartesian coordinate system;

biasing the pointing device by applying a bias force to each of the force sensors so that each sensor exhibits a bias force when no force is applied by the user while no external force is applied to the pointing device, acquiring sensor data from each of the pointing device force sensors, thereby determining force sensor bias values;

while external force is applied to the pointing device by the user acquiring sensor data comprising raw force values from each of the pointing device force sensors;

compensating each of the force values responsive to the corresponding force sensor bias value to form a corresponding unbiased force value; and combining the unbiased sensor force values to form X and Y vectors by computing the X and Y vectors according to the formulae:

$$X=(NE+SE)-(NW+SW) \text{ and } Y=(NE+NW)-(SW+SE)$$

for repositioning the cursor in the horizontal and vertical directions, respectively, on the display screen.

16. A method of controlling cursor motion on a display screen to move the cursor in an ergonomically efficient manner responsive to a lateral force applied by a user pressing a pointing device, the method comprising:

providing first and second force sensors in the pointing device, the first sensor responsive to force applied in a first direction and the second sensor responsive to force applied in a second direction angularly offset from the first direction;

sensing the user-applied force in the first sensor to form a first analog electrical signal representing force applied along the first direction;

converting the first analog electrical signal to a first digital signal representing a first raw force sensor value;

sensing the user-applied force in the second sensor to form a second analog electrical signal representing force applied along the second direction;

converting the second analog electrical signal to a second digital signal representing a second raw force sensor value;

linearizing each of the first and second raw force sensor values so as to compensate for non-linearities inherent in the force sensors, keycap mechanics and in said converting step, thereby forming first and second linear force values, respectively, that are substantially linearly related to the force applied to the pointing device by the user;

converting the first and second linear force values to form net X and net Y force values, where the net X force value represents a component of the user-applied force along a horizontal axis corresponding to a horizontal line on the display screen and the net Y force value represents a component of the user-applied force along a vertical axis corresponding to a vertical line on the display screen;

combining the net X force value and the net Y force value to form an XY magnitude value that reflects the total lateral force applied by the user;

determining a speed factor;

multiplying each of the net X force value and net Y force value by the speed factor to determine x and y cursor displacement values, respectively;

repositioning the cursor on the display screen by a horizontal and vertical offsets corresponding to the x and y displacement values, respectively; and periodically repeating said repositioning step, thereby moving the cursor on the display screen with an apparent speed and direction responsive to the user-applied force.

17. A method according to claim 16 further comprising:

providing third and fourth force sensors coupled to the pointing device;

arranging the third force sensor opposite the first force sensor in the pointing device, so that force applied along the first direction increases force in the first force sensor and decreases force in the third force sensor;

arranging the fourth force sensor opposite the second force sensor in the pointing device, so that force applied along the second direction increases force in the second force sensor and decreases force in the fourth force sensor;

sensing the user-applied force in the third sensor to form a third analog electrical signal representing force applied opposite to the first direction;

converting the third analog electrical signal to a third digital signal representing a third raw force sensor value;

sensing the user-applied force in the fourth sensor to form a fourth analog electrical signal representing force applied opposite to the second direction;

converting the fourth analog electrical signal to a fourth digital signal representing a fourth raw force sensor value;

linearizing each of the third and fourth raw force sensor values so as to compensate for non-linearities inherent in the force sensors, pointing device mechanics and in said converting steps, thereby forming third and fourth linear force values, respectively, that are substantially linearly related to the force applied by the user;

subtracting the third linear force sensor value from the first linear force sensor value to determine the net X force value; and subtracting the fourth linear force sensor value from the second linear force sensor value to determine the net Y force value.

18. A method according to claim 16 further comprising:

biasing the force sensors to a standby operating point so that the force sensor values exhibit a non-zero bias value in the absence of any force applied by the user; and adjusting each of the linear force values by subtracting the corresponding bias value so that the adjusted linear force values represent only the force applied by the user.

19. A method according to claim 16 wherein said determining a speed factor includes the steps of:

for low net X and net Y force values, selecting a first speed factor for lower apparent cursor speeds; and for higher net X and net Y force values, selecting a second speed factor greater than the first speed factor for faster apparent cursor speeds.

20. A method according to claim 16 further comprising limiting the speed factor to a predetermined speed limit value thereby limiting the apparent cursor motion speed on the display screen.

21. A method according to claim 16 wherein said determining a speed factor includes computing a speed value according to a formula:

$$\text{speed} = \text{SQUARE} \times (M-\text{NULL})^2 \ \text{LINEAR} \times (M-\text{NULL}), \text{ where}$$

SQUARE is a predetermined square term coefficient,

M is the XY magnitude value,

NULL is a predetermined minimum force to initiate cursor motion, and

LINEAR is a predetermined linear term coefficient.

22. A method according to claim 21 further comprising:
providing a first value for use as the SQUARE term coefficient during repositioning operations and a second value for use as the SQUARE term coefficient during dragging operations;
checking status of the mouse buttons to determine whether the user is repositioning or dragging; and
if repositioning, selecting the first value for use as the SQUARE term coefficient for computing the speed value; and
if dragging, selecting the second value for use as the SQUARE term coefficient for computing the speed value, thereby adjusting the cursor tracking responsive to the mouse button status.

23. A method according to claim 21 wherein the first value is greater than the second value so that the computed speed value is greater for a repositioning operation than for a dragging operation.

24. A method according to claim 21 further comprising:
providing a first value for use as the LINEAR term coefficient during repositioning operations and a second value for use as the LINEAR term coefficient during dragging operations;
checking status of the mouse buttons; and
selecting one of the first and second values responsive to the mouse button status for use as the LINEAR term coefficient in said computing the speed value.

25. A method according to claim 17 further comprising:
arranging the four force sensors offset by forty-five degrees from a predetermined cartesian coordinate system having an X direction corresponding to horizontal dimension on the display screen and a Y direction normal to the X direction, so that each of the force values corresponds to one of NE,SE,SW and NW directions relative to the cartesian coordinate system; and wherein combining the sensor force values to form X and Y force values includes computing the X and Y force values according to the formulae:

$$X=(NE+SE)-(NW+SW) \text{ and } Y=(NE+NW)-(SW+SE).$$

26. A keyboard for use in combination with a computer having a cursor visible on a display screen, the keyboard comprising:
an array of keyswitches each having a keycap;
force sensor means coupled to a selected one of the keycaps and responsive to a user pressing on the selected keycap for generating at least two electrical signals, each electrical signal associated with a corresponding direction; and
signal processing means for controlling movement of the cursor on the display screen responsive to the electrical signals;
said signal processing means including means for providing differing time response characteristics of said cursor movement responsive to the said user pressing on the keycap, the time response including a faster cursor movement while the user is a conducting a cursor repositioning operation and a slower cursor movement while the user is conducting a cursor dragging operation.

27. A computer system comprising:
a display screen having means for displaying a cursor;
a keyboard having an array of keyswitches, each of the keyswitches having a keycap coupled thereto;
force sensor means in the keyboard coupled to a selected one of the keycaps and responsive to a user pressing on the selected keycap for generating at least two electrical signals, each electrical signal associated with a corresponding direction on the display screen; and
signal processing means coupled to the force sensor means for repositioning the cursor on the display screen in the corresponding directions in response to the electrical signals;
said signal processing means including means for providing differing time response characteristics of said cursor movement responsive to the said user pressing on the keycap, the time response including a faster cursor movement while the user is a conducting a cursor repositioning operation and a slower cursor movement while the user is conducting a cursor dragging operation.

* * * * *

UNITED STATES PATENT AND TRADEMARK OFFICE
CERTIFICATE OF CORRECTION

PATENT NO. : 6,040,821
DATED : March 21, 2000
INVENTOR(S) : Patrick J. Franz et al.

It is certified that error appears in the above-identified patent and that said Letters Patent is hereby corrected as shown below:

Column 1,
Line 7, "071649,711" should read -- 07/649,711 --;
Line 14, "confinuation-in-part" should read -- continuation-in-part --;

Column 3,
Line 65, "34, 31" should read -- 34. 31 --;

Column 4,
Line 31, "point Additional" should read -- point. Additional --;

Column 5,
Line 2, "100 K to 1 K" should read -- 100 K to 10 K --;
Line 60, "1n2" should read -- In2 --;

Column 7,
Line 1, "users" should read -- user's --;

Column 11,
Line 42, "sevreset" should read -- set/reset --;
Line 55, "I 5" should read -- 15 --;

Column 12,
Line 61, "AID" should read -- A/D --;

Column 14,
Line 22, "(1/18th)" should read -- (1/8th) --;
Line 38, "AID" should read -- A/D --;

Column 18,
Line 20, "407/218" should read -- 408/218 --;
Line 67, "segment In" should read -- segment. In --;

Column 19,
Lines 62-63, "our Likewise" should read -- out. Likewise --;

Column 22,
Lines 20-35, sentences beginning with "An advantage of using" to and including "controlled cursor positioning" should be its own paragraph, deleted from its current location and inserted at Column 21, line 26, before paragraph beginning "Thus, according to";
Line 59, "forthe" should read -- for the --;

UNITED STATES PATENT AND TRADEMARK OFFICE
CERTIFICATE OF CORRECTION

PATENT NO. : 6,040,821
DATED : March 21, 2000
INVENTOR(S) : Patrick J. Franz et al.

It is certified that error appears in the above-identified patent and that said Letters Patent is hereby corrected as shown below:

Column 24,
Line 46, "1 5" should be deleted;
Line 63, "input 30 magnitudes" should read -- input magnitudes --;

Column 25,
Line 30, "non-inear" should read -- non-linear --;

Column 28,
Line 66, "tbhe" should read -- the --;

Column 29,
Line 6, "use" should read -- user --;
Line 15, "user" should read -- user; --;

Column 31,
Line 12, "(M—NULL)2 LINEARx(M—NULL)" should read -- (M—NULL)2 + LINEARx(M—NULL) --.

Signed and Sealed this

Twenty-fifth Day of October, 2005

JON W. DUDAS
*Director of the United States Patent and Trademark Office*